(12) United States Patent
Nakajima et al.

(10) Patent No.: US 8,150,190 B2
(45) Date of Patent: Apr. 3, 2012

(54) PRINTING DEVICE, IMAGE DATA FILE PROCESSING DEVICE, METHOD OF SELECTING IMAGE DATA FILE, AND COMPUTER PROGRAM PRODUCT

(75) Inventors: Ayahiro Nakajima, Matsumoto (JP); Kenji Fukasawa, Matsumoto (JP); Kenji Matsuzaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1322 days.

(21) Appl. No.: 11/821,033

(22) Filed: Jun. 20, 2007

(65) Prior Publication Data
US 2007/0296989 A1      Dec. 27, 2007

(30) Foreign Application Priority Data

Jun. 21, 2006   (JP) ................................ 2006-171177
Jan. 18, 2007   (JP) ..................................... 2007-9208

(51) Int. Cl.
*G06K 9/40* (2006.01)
(52) U.S. Cl. ........ 382/255; 382/162; 382/167; 382/254; 382/274; 358/1.9; 358/447
(58) Field of Classification Search .................. 382/254, 382/255, 162, 167, 274, 232; 358/1.9, 3.31, 358/447, 461, 463; 348/345, 357; 250/201.2, 250/201.8; 355/55, 63; 396/89
See application file for complete search history.

(56) References Cited

U.S. PATENT DOCUMENTS

| | | | | |
|---|---|---|---|---|
| 7,317,843 B2* | 1/2008 | Sun et al. | ...................... | 382/274 |
| 7,693,342 B2* | 4/2010 | Poon et al. | ...................... | 382/255 |
| 7,983,497 B2* | 7/2011 | Kakii et al. | ................... | 382/232 |
| 2005/0219391 A1* | 10/2005 | Sun et al. | ...................... | 348/255 |
| 2006/0204120 A1* | 9/2006 | Poon et al. | ...................... | 382/254 |

FOREIGN PATENT DOCUMENTS

| | | |
|---|---|---|
| JP | 04-170872 | 6/1992 |
| JP | 10-340332 | 12/1998 |
| JP | 2002-010179 | 1/2002 |
| JP | 2004-343207 | 12/2004 |

OTHER PUBLICATIONS

Abstract of Japanese Patent Publication No. 04-170872, Pub. Date: Jun. 18, 1992, Patent Abstracts of Japan.
Abstract of Japanese Patent Publication No. 10-340332, Pub. Date: Dec. 22, 1998, Patent Abstracts of Japan.
Abstract of Japanese Patent Publication No. 2002-010179, Pub. Date: Jan. 11, 2002, Patent Abstracts of Japan.
Abstract of Japanese Patent Publication No. 2004-343207, Pub. Date: Dec. 2, 2004, Patent Abstracts of Japan.

* cited by examiner

*Primary Examiner* — Samir Ahmed
*Assistant Examiner* — Ali Bayat
(74) *Attorney, Agent, or Firm* — Martine Penilla Group, LLP

(57) ABSTRACT

With a minimal process load, to determine level of the image of an image data file, for image data files of a format that saves images in the form of coefficients of discrete frequency components. Image data that includes a plurality of coefficients representing the pattern of change of color of the image are acquired (Step S10). Multiple sets of basic pattern data that respectively include a plurality of basic coefficients representing basic patterns of color change are prepared. Then, based on a comparison of the two, one set of selected basic pattern data is selected from among the multiple sets of basic pattern data (Step S20). Subsequently, the blur level of the image of the image data is calculated, based on the basic blur level associated with the selected basic pattern data (S30-S70).

20 Claims, 18 Drawing Sheets

Fig.4

AC COMPONENTS
DC  LOW (HORIZONTAL DIRECTION) HIGH
COMPONENTS

| F00 | F01 | F02 | F03 | F04 | F05 | F06 | F07 |
|-----|-----|-----|-----|-----|-----|-----|-----|
| F10 | F11 | F12 | F13 | F14 | F15 | F16 | F17 |
| F20 | F21 | ... | ... | ... | ... | ... | ... |
| F30 | F31 | ... | ... | ... | ... | ... | ... |
| F40 | F41 | ... | ... | ... | ... | ... | ... |
| F50 | F51 | ... | ... | ... | ... | ... | ... |
| F60 | F61 | ... | ... | ... | ... | F66 | F67 |
| F70 | F71 | ... | ... | ... | ... | F76 | F77 |

AC COMPONENTS (VERTICAL DIRECTION) LOW → HIGH

Fig.8

| LUMINANCE CHANGE PATTERN | SIGN OF F01 (F10) | SIGN OF F01 (F10) AND SIGN OF F02 (F20) |
|---|---|---|
| P01a | + | = |
| P01b | − | ≠ |
| P01c | − | = |
| P01d | + | ≠ |

| SIGN OF F01 (F10) | SIGN OF F01 (F10) AND SIGN OF F02 (F20) | BASIC PATTERN GROUP |
|---|---|---|
| + | = | PGa |
| − | ≠ | PGb |
| − | = | PGc |
| + | ≠ | PGd |

PRINTING DEVICE, IMAGE DATA FILE PROCESSING DEVICE, METHOD OF SELECTING IMAGE DATA FILE, AND COMPUTER PROGRAM PRODUCT

BACKGROUND

1. Technical Field

This invention relates to technology for determining the extent of blur in an image of an image data file.

2. Related Art

Technologies for selecting an in-focus image from among a number of photographic images have existed for some time. For example, in one conventional technology, during shooting a photograph the image pickup device is moved from a reference position to two locations forward and rearward, and an evaluation function is calculated for images taken at the respective locations. The reference position of the image pickup device is then changed either forward and rearward, whichever gives the better value for the evaluation function. This process is repeated to determine a focal point for the image pickup device.

The evaluation function is computed as follows. Specifically, frequency conversion is carried out for blocks of 8×8 pixels in the image, and 8×8 frequency components $a_{kl}$ (k=1-8, l=1-8) are derived for each. The sum for all of the blocks of "the value derived by dividing the sum of the absolute values of the high frequency components (k+l>9) among the 8×8 frequency components $a_{kl}$ (k=1-8, l=1-8), by the sum of the absolute values of the low frequency components (k+l<7)" is employed as the evaluation function.

In another conventional technology, a process such as the following is carried out when making the determination as to whether an image is blurred. Specifically, the square root of sum of squares g(x, y) is calculated for brightness differential fx, fy between a target pixel in an image and pixels neighboring the target pixel in the X direction and Y direction. Next, the average value of g(x, y) for all pixels in the image is computed by way of a "sharpness level SL." The determination as to whether an image is blurred is made based on the magnitude of this SL.

However, with the former technology, it is necessary to compute a total of 48 components, i.e. the 28 components constituting the high frequency components (k+l>9) among the 8×8 frequency components $a_{kl}$ (k=1-8, l=1-8) and the 21 components constituting the low frequency components (k+l<7), for all of the blocks in the image. That is, the volume of computations is enormous, and processing overhead is high. Moreover, this technology is adapted for comparing images of identical composition.

The latter technology, on the other hand, cannot be applied directly to images in the JPEG format, which saves an image in the form of coefficients of discrete frequency components, rather than a format that saves an image in the form of color information for the pixels, such as the BMP format. That is, where image data is data in the JPEG format, the entire image must first be converted to a format having color information for each pixel (e.g. the BMP format). Consequently, processing overhead is quite high.

With the foregoing in view, an aspect of the invention is directed to image data files containing images saved in the form of coefficients of discrete frequency components and is adapted to determine, with a minimum of processing overhead, the level of blurring of images of such image data files.

The entire disclosure of Japanese patent application No. 2007-9208, of SEIKO EPSON is hereby incorporated by reference into this document.

SUMMARY

An advantage of some aspects of the invention is that processes such as the following are carried out during computation of the blur level of images of image data. "Blur level" is a parameter that represents the extent to which an image is blurred; the parameter assumes a larger value in association with greater blurring of an image.

The image data includes a plurality of coefficients representing a pattern of change of color of an image along a prescribed direction. The plurality of coefficients corresponds respectively to different frequency component. The pattern of color change of the image can be the pattern of change in luminance (brightness). The pattern of color change of the image can also be the pattern of change of values of the RGB or YCrCb color components.

The following procedures are performed for calculating blur level of an image of image data. Image data is acquired. The image data includes a plurality of coefficients representing a pattern of change of color of an image along a prescribed direction. The plurality of coefficients corresponds respectively to different frequency components.

Multiple sets of basic pattern data are prepared. The multiple sets of basic pattern data respectively include a plurality of basic coefficients representing a pattern of change of color. The plurality of basic coefficients correspond respectively to different frequency components. Each of the multiple sets of the basic pattern data includes data representing a basic blur level that represents blur level in color boundary areas.

On the basis of comparison of the plurality of coefficients included in the acquired image data with the plurality of basic coefficients respectively included in the multiple sets of basic pattern data, one set of selected basic pattern data is selected from among the multiple sets of basic pattern data. The "comparison" of the plurality of coefficients included in image data with the plurality of base counts may entail direct comparison of the plurality of coefficients included in the image data with the plurality of basic coefficients, but could include also indirect comparison of the plurality of basic coefficients with a plurality of numbers derived by carrying out a prescribed process on the plurality of coefficients. Then blur level of the image of the image data is calculated based on the basic blur level associated with the selected basic pattern data.

According to this embodiment, the blur level of images of image data files can be determined with less processing overhead, for image data files containing images saved in the form of coefficients of discrete frequency components.

The present invention can also be constituted as a printing device for selecting candidate image data from among multiple sets of image data. Such a printing device include a data acquiring unit, a basic pattern memory, a basic pattern selecting unit, a candidate determining unit, and a printing unit.

The data acquiring unit may acquire one set of image data from among multiple sets of image data. The image data includes a plurality of coefficients representing a pattern of change of color of an image along a prescribed direction. The plurality of coefficients corresponds respectively to different frequency component.

The basic pattern memory may store a multiple sets of basic pattern data that respectively include a plurality of basic coefficients representing a pattern of change of color, the plurality of basic coefficients corresponding respectively to different frequency components.

According to this embodiment, it is possible to select and print candidate image data, with a minimum of processing overhead, from among a plurality of set of image data containing images saved in the form of coefficients of discrete frequency components.

The basic pattern selecting unit, in the event that a prescribed first condition is met, may select the selected basic pattern data on the basis of comparison of the plurality of coefficients representing the pattern of change of color of the image along the prescribed direction within a target region which is part of the image of the image data, with the plurality of basic coefficients respectively contained in the multiple sets of basic pattern data stored in the basic pattern memory.

The candidate determining unit may determine a localized blur level of the target region on the basis of the basic blur level of the selected basic pattern data. Then the candidate determining unit may determine whether to designate the acquired image data as the candidate on the basis of the localized blur levels of a plurality of the target regions included in the image of the acquired image data. According to this embodiment, the blur level of an image as a whole can be calculated taking into consideration the localized blur level in portions of the image.

In another possible embodiment, selected basic pattern data can be selected by comparing the image as a whole with the basic patterns, rather than selecting selected basic pattern data for each target region of the image.

It is preferable that the basic coefficients are coefficients corresponding to AC components among the frequency components. The basic pattern selecting unit may preferably select the selected basic pattern data, on the basis of comparison of the coefficients corresponding to AC components among the plurality of coefficients of the target region, and the plurality of basic coefficients respectively included in the multiple sets of basic pattern data.

According to this embodiment, comparison of color patterns with basic patterns can be carried out in a manner unaffected by the extent of absolute density or contrast of color. Consequently, fewer basic pattern data sets will be needed for comparison.

It is preferable that the plurality of basic coefficients are positive numbers and sum of the plurality of basic coefficients in one set of the basic pattern data is a certain value. The basic pattern selecting unit may further calculate, for the target region, the coefficients corresponding to the frequency components on the basis of proportions of the magnitudes of the absolute values of the frequency components, in a manner such that the sum will equal the certain value.

According to this embodiment, comparison of color patterns with basic patterns can be carried out in a manner unaffected by the absolute magnitude of the range of change in color (including luminance).

It is preferable that the multiple sets of basic pattern data have data of prescribed ranking. When selecting the selected basic pattern data, the basic pattern selecting unit may preferably perform the following procedures. The basic pattern selecting unit compares the plurality of basic coefficients of the multiple sets of basic pattern data, in order in accordance with the prescribed ranking, to the plurality of coefficients of the target region. The basic pattern selecting unit selects as the selected basic pattern data the initial pattern for which difference between the plurality of basic coefficients and the plurality of coefficients is less than a prescribed criterion.

According to this embodiment, selected basic pattern data having a plurality of basic coefficients somewhat similar to the plurality of coefficients of a target region can be selected, without comparing the coefficients of a target region with the basic coefficients of all of the basic pattern data.

It is preferable that the plurality of basic coefficients represent, as the basic pattern of change of color, a pattern of change of luminance changing from a first value to a second value within a prescribed interval. The basic blur level may preferably be a value corresponding to a width of an interval of change from the first value to the second value, within the prescribed interval.

In the event that an interval of change in luminance in first selected basic pattern data selected on the basis of a first target region, and an interval of change in luminance in second selected basic pattern data selected on the basis of a second target region neighboring the first target region in the prescribed direction, are respectively situated at an edge to a side of the other target region within the prescribed interval, and directions of change in luminance is same, the candidate determining unit may preferably perform the following procedure.

Specifically, the candidate determining unit may preferably calculate the localized blur level of at least one of the first and second selected basic pattern data, on the basis of the sum of the basic blur level of the first and second selected basic pattern data. According to this embodiment, localized blur level can be calculated even in instances where the boundary of areas having mutually different color in an image has blur extending across the target area.

In preferred practice, even in an instance such as the following, the basic pattern selecting unit will calculate localized blur level in at least one of the first and second target regions, on the basis of the sum of basic blurring of the selected basic pattern data of the first and second target regions. The instance is one in which, in the first and second selected basic pattern data, the interval of change in luminance is situated at a location inward by no more than a prescribed value from the edge of the respective other target region in the prescribed interval, with the direction of change in luminance being the same.

In the course of image processing which is carried out in advance for image data, at the edge of a target region there sometimes produced an area of given luminance that should not be there. However, according to the embodiment described above, localized blurring can be calculated properly for such target regions as well.

The prescribed intervals of the multiple basic patterns may be mutually equal in size. According to this embodiment, there is no need to consider the size of the region of a basic pattern in comparisons of coefficients of the target region with basic coefficients of basic patterns data. Consequently, comparisons of target region coefficients with basic coefficients of basic patterns data can be made easily.

In preferred practice, the size of the prescribed interval of the target region may be 8 pixels of image data. The DCT coefficient of image data in JPEG format is a coefficient that relates to a target region of 8×8 pixels. Thus, according to the embodiment described above, comparisons of patterns of basic pattern data with patterns of change in color in target regions can be made easily.

The multiple basic patterns may include basic patterns of prescribed intervals of that differ in size. According to this embodiment, from among a plurality of basic patterns there can be selected basic patterns similar to various patterns of change in color of different size (number of pixels).

The first condition may be preferably be a condition that the sum of the absolute values of the plurality of coefficients of the target region is greater than a prescribed criterion value. According to this embodiment, the process of selecting selected basic pattern data can be dispensed with, for regions of negligible color change. It is thus possible to reduce the processing overhead entailed in calculating the blur level of images.

In the event that the first condition is not met, and a prescribed second condition is met, the basic pattern selecting unit may preferably select the selected basic pattern data on the basis of the difference in luminance of the two mutually neighboring target regions. More specifically, in the event that the luminance differential exceeds a prescribed value, it is preferable to select as the selected basic pattern data the basic pattern with the lowest basic blur level, from among the basic pattern data.

According to this embodiment, selected basic pattern data can be associated appropriately for a color boundary, even in cases where the color boundary overlaps the target region boundary. In preferred practice the second condition will be that, for two neighboring target regions lying along a prescribed direction in relation to the pattern of color change mentioned above, the total of the absolute values of the plurality of coefficients of both will be smaller than a prescribed criterion value.

In preferred practice the candidate determining unit will carry out a process such as the following, during determination of localized blur level. The candidate determining unit selects the selected basic pattern data based on the plurality of coefficients representing the pattern of change of color of the image in the target region along a horizontal direction of the image as one of the prescribed directions, and calculates horizontal blur level of the target region based on the basic blur level of the selected basic pattern data. The candidate determining unit then selects the selected basic pattern data based on the plurality of coefficients representing the pattern of change of color of the image in the target region along a vertical direction of the image as one of the prescribed directions, and calculates vertical blur level of the target region based on the basic blur level of the selected basic pattern data.

The candidate determining unit then determines the localized blur level of the target region on the basis of the horizontal blur level and the vertical blur level. According to this embodiment, the blur level of an image can be determined taking into consideration the blur level in two directions at a 90 degree angle to one another.

It is preferable that the candidate determining unit determines the localized blur level of the target region on the basis of the larger of the horizontal blur level and the vertical blur level. According to this embodiment, the blur level can be determined appropriately even in instances where an image is blurred in a particular direction, or where for some reason a small value has been calculated in error for either the horizontal blur level or the vertical blur level.

It is preferable that the candidate determining unit designates the acquired image data to be the candidate in the event that a region of prescribed size is contained in the image of the acquired image data, and the region contains target regions having localized blur level smaller than a first criterion value present in a greater number than a second criterion value.

According to this embodiment, if there is a region of distinct contour in an image data image, the image data can be selected as a candidate for printing, even if contours in other regions are indistinct. In preferred practice, the size of the prescribed region will be H 0.4-1.6 cm×W 0.4-1.6 cm, where the image will be printed onto L size paper.

In a preferred embodiment, the first and second criterion values are specified on the basis of the pixel count of the image of the image data, and the size of the image data when the image is printed. This is because in some instances the determination by a human observer as to whether a given image is blurred may differ depending on the size represented by one pixel of image data during printing.

The multiple sets of basic pattern data may be classed into a plurality of basic pattern data groups respectively including one or more of sets of the basic pattern data. In such an embodiment, the basic pattern selecting unit may preferably include a group selecting unit for selecting one of the plurality of basic pattern data groups on the basis of some of the plurality of coefficients of the image data, during selection of the selected basic pattern data. The basic pattern selecting unit may select one set of selected basic pattern data from among the multiple sets of basic pattern data, on the basis of comparison of the plurality of coefficients contained in the image data, with the plurality of basic coefficients contained in the basic pattern data of the selected basic pattern data group.

According to this embodiment, the number of basic patterns for carrying out comparison of coefficients can be limited in advance. Thus, processing overhead can be reduced in comparison to a mode in which comparison of coefficients is carried out for all basic patterns.

In preferred practice, a process such as the following will be carried out in the embodiments described above. In the event that a prescribed first condition is met, the basic pattern selecting unit selects the selected basic pattern data on the basis of a comparison of the plurality of coefficients representing the pattern of change of color of the image along the prescribed direction within a target region which is part of the image of the image data, with the plurality of basic coefficients respectively contained in the multiple sets of basic pattern data stored in the basic pattern memory. The candidate determining unit determines a localized blur level of the target region on the basis of the basic blur level of the selected basic pattern data. The candidate determining unit determines whether to designate the acquired image data as the candidate on the basis of the localized blur levels of a plurality of the target regions included in the image of the acquired image data. The basic coefficients are coefficients corresponding to AC components among the frequency components. The basic pattern selecting unit selects the selected basic pattern data, on the basis of comparison of the coefficients corresponding to AC components among the plurality of coefficients of the target region, and the plurality of basic coefficients respectively included in the multiple sets of basic pattern data.

The plurality of basic coefficients may be coefficients sum of whose absolute values is a certain value. The basic pattern selecting unit may further calculate, for the target region, the coefficients corresponding to the frequency components on the basis of the frequency components, in a manner such that the sum of absolute values will equal the certain value.

In this embodiment, selected basic pattern data can be selected from among a limited given number of basic pattern data sets, with respect to luminance change patterns of different absolute magnitude regardless of the magnitude of the change in luminance.

The group selecting unit may preferably select one of the plurality of the plurality of basic pattern data groups, on the basis of the sign of coefficients that, among the plurality of coefficients, correspond to AC components of the first and second lowest frequency among the frequency components.

According to this embodiment, basic pattern data groups can be selected with less processing overhead, as compared to a mode in which basic pattern data groups are selected through calculation of color density at each pixel position within a target region.

The following aspect may be preferable. The basic pattern selecting unit, in the event that a prescribed first condition is met, selects the selected basic pattern data associated with a target region, on the basis of comparison of the plurality of coefficients representing the pattern of change of color of the image along the prescribed direction within the target region which is part of the image of the image data, with the plurality of basic coefficients respectively contained in the multiple sets of basic pattern data stored in the basic pattern memory.

The candidate determining unit may determine a localized blur level of the target region included in the image of the acquired image data, on the basis of the basic blur level of the selected basic pattern data. The candidate determining unit may determine a first evaluation value corresponding to a difference between a maximum value and a minimum value of color density in the target region, on the basis of the plurality of coefficients of the target region. The candidate determining unit may determine a second evaluation value relating to the plurality of target regions included in the image of the acquired image data, on the basis of the first evaluation value of the target regions included in the plurality of target regions. In the event that the second criterion value meets a prescribed second condition, the candidate determining unit may determine whether the acquired image data is the candidate, based on the localized blur level of the target regions included in the plurality of target regions.

According to this embodiment, the determination as to whether to determine localized blur level of target regions on the basis of localized blur level of a plurality of target regions can be made with consideration to color density differential of color density in an image. Consequently, it is possible to reduce the likelihood of making determinations in relation to image data, based on localized blur levels of a plurality of target regions determined by treating as the boundary an area that is not a boundary between regions of different color.

The second condition can be set, for example, on the basis of comparison of the second evaluation value with a prescribed threshold value. The second condition can be that "the second evaluation value is greater than the prescribed threshold value" in the event that, with other conditions the same, the second evaluation value assumes a greater value the greater the value of the first evaluation value. Alternatively, the second condition can be that "the second evaluation value is smaller than the prescribed threshold value" in the event that, with other conditions the same, the second evaluation value assumes a smaller value the greater the value of the first evaluation value. That is, it is sufficient for the second condition to be any judgment condition that employs the second evaluation value during judgments as to whether the condition is fulfilled.

The plurality of target regions may be a plurality of target regions present in succession in the prescribed direction, and which meet a prescribed condition relating to the selected basic pattern data.

According to this embodiment, for an area straddling a plurality of target regions in an image and whose color density changes along one direction, determination of localized blur level can be carried out taking into consideration the level of change of color density in that area. Specifically, the determination as to whether to determine localized blur level of target regions contained in that area on the basis of localized blur level of a plurality of target regions can be made with consideration of the level of change of color density in the area. Consequently, it is possible to reduce the likelihood of making determinations in relation to image data by treating an area that is not a boundary between regions of different color as a boundary between regions of different color. The second evaluation value can be, for example, the sum of the first evaluation values of target regions included among the plurality of target regions.

In preferred practice, the prescribed condition relating to selected basic pattern data may include the following, at least in part. The condition is one that the basic pattern representing the selected basic pattern data includes an area of changing luminance, at at least one edge of the basic pattern.

According to this embodiment, it is possible to decide accurately whether a given target region is a target region that is included in an area of continuously varying color density.

The proviso that "Condition A includes Condition a1 at least in part" includes two possible forms, i.e. that "Condition a1 is included by way of a necessary condition for meeting Condition A (an AND condition)" or that "Condition a1 is included by way of a condition such that Condition A is met when at least one condition from among Condition a1 and at least one other condition is met (an OR condition)." Another possible form is that Condition A constitutes a combination of these subordinate conditions (the AND condition and OR condition). Specifically, "Condition A includes Condition a1 at least in part" means the fact or relation that "it is necessary to decide whether Condition a1 is met, in order to decide whether Condition A is met for a particular object."

The candidate determining unit may preferably derive the first evaluation value, based on the ratio of the sum of absolute values of coefficients that are the coefficients of the target region and that correspond to AC components among the frequency components, to the sum of absolute values of coefficients that are the basic coefficients of the selected basic pattern data and that correspond to AC components among the frequency components.

According to this embodiment, first evaluation values can be calculated with less processing overhead, as compared to where color density at each pixel position is calculated, and first evaluation values are calculated corresponding to the difference between maximum value and minimum value of color density in the target region. In preferred practice, first evaluation values will be derived by further dividing the above ratio by $2\sqrt{2}$.

It is possible for the present invention to be reduced to practice in various modes, for example, a printing method and a printing device; a printing control method and a printing control device; a method for determining whether there is blur in an image of photographic image data, and a device for implementing the method; a computer program for implementing the functions of such a method or device; a recording medium having such a computer program recorded thereon; a data signal containing such a computer program and taking the form of a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIG. 4 depicts DCT coefficients for an image of a target region in which image data is stored in JPEG format;

FIG. 8 is a chart showing the relationship between the direction of luminance change patterns and sign of the DCT coefficients;

DESCRIPTION OF EXEMPLARY EMBODIMENT

A. Embodiment 1

Figure 1:
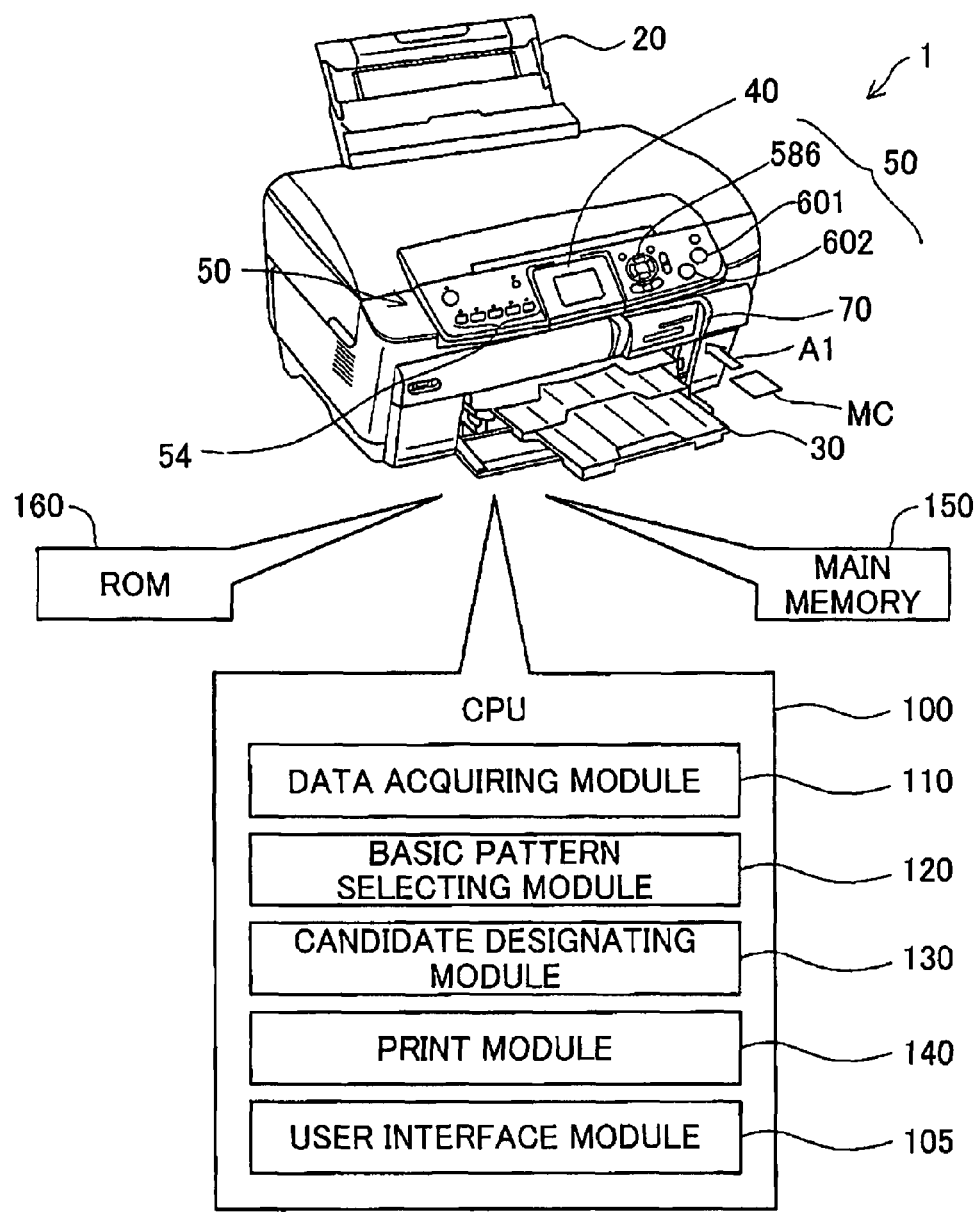
FIG. 1 is a perspective view showing a printer 1 pertaining to an embodiment of the present invention.

FIG. 1 is a perspective view of the present invention in the embodiment 1 of a printer 1. The printer 1 is able to carry out printing independently on the basis of an image data file stored on a recording medium, without the printer being connected to an external computer. This printer 1 includes a print head (not shown) that prints by ejecting ink drops; an auto sheet feed 20 for feeding the printing paper; a paper discharge tray 30 for receiving printing paper on which images have been imprinted; a liquid crystal display 40; a button group 50 for performing various operations; a card slot 70 for reading data from an inserted memory card; a CPU 100; a main memory 150; and a ROM 160. In FIG. 1, the CPU 100, the main memory 150, the ROM 160 are depicted to the outside of the printer as a aid to description.

A memory card MC such as a Compact Flash™ card, SD card, miniSD card, memory stick, smart media card, or the like can be inserted into the card slot 70 directly, or via an adaptor (see arrow A1 in FIG. 1). Via the card slot 70 the CPU 100 can then acquire a number of image data files stored on the memory card MC.

Figure 2:
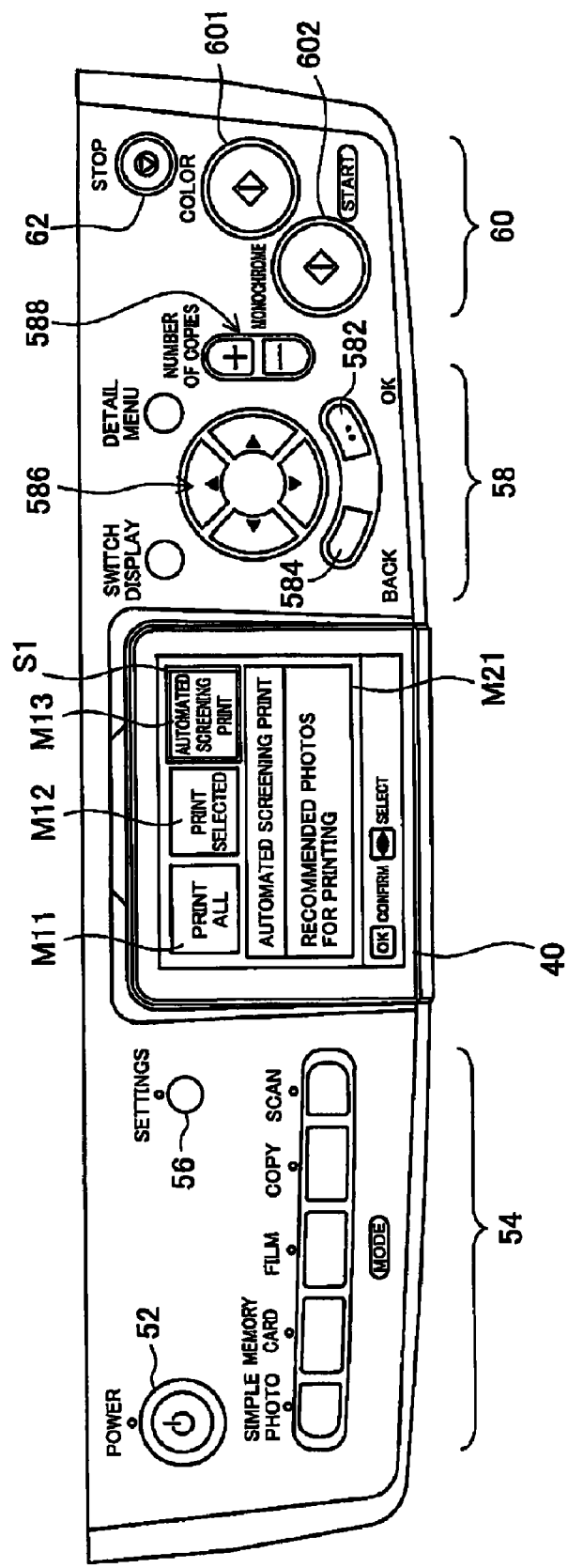
FIG. 2 is an enlarged plan view depicting a control panel having a liquid crystal display 40 and a button group 50.

FIG. 2 is an enlarged plan view depicting a control panel having a liquid crystal display 40 and a button group 50. The liquid crystal display 40 is 2.5 inches in size and located in the center of the control panel. The liquid crystal display 40 is capable of displaying color images. The liquid crystal display 40 can also display images of image data files stored on a memory card MC, for example. The liquid crystal display 40 can also display information indicating the status of the printer 1, as well as control menus for use when a user inputs instructions to the printer 1 via the button group 50, for example.

The CPU 100 function module that displays a user interface on the liquid crystal display 40 and prompting the user for instructions, and for receiving instructions from the user via the button group 50, is depicted in FIG. 1 as a user interface module 105.

To either side of the liquid crystal display 40 are provided buttons 52-62 for performing various operations. These are referred to collectively as the button group 50. The Power button 52 is a button for turning the power to the printer 1 ON/OFF. The Mode button group 54 is a set of buttons enabling the user to switch among different printer operating modes. Each button corresponds to one operating mode. The Settings button 56 is a button that is pressed during various maintenance operations of the printer 1 or when making operational settings for each mode.

The Menu button group 58 is a set of buttons for controlling the various types of numeric values and icons displayed on the liquid crystal display 40. The Start button group 60 includes two buttons 601, 602 for selecting whether to perform color printing or monochrome printing. One button is assigned respectively to color printing and to monochrome printing. The Stop button 62 is a button for halting an operation currently being executed by the printer 1.

The Menu button group 58 includes an OK button 582 for inputting confirmation of settings displayed on the liquid crystal display 40; a Back button 584 for displaying the content displayed on the liquid crystal display 40 during the previous step; a Select button group 586 composed of four buttons for selecting one item from among a number of icons or menus displayed on the liquid crystal display 40; and a Number of Copies button group 588 for specifying a number of copies for printing. By providing these button groups, a user can easily select and print image data files stored on a memory, despite the fact that the printer 1 has only a relatively small display.

On the liquid crystal display 40 shown at center in FIG. 2 there is shown a display produced when a memory card MC containing image data files stored thereon is inserted into the card slot 70 of the printer 1 (see arrow A1 in FIG. 1), and the "Memory Card" button of the Mode button group 54 is pressed. In the upper part of the liquid crystal display 40 are displayed three menus, namely, "Print All" M11, "Select and Print" M12, and "Automated Screening Printing" M13. The "Automated Screening Printing" menu M13 is bordered by a frame S1. In the condition depicted in FIG. 2, the "Automated Screening Printing" menu M13 has been provisionally selected.

In the lower part of the liquid crystal display 40 is displayed a display M21 that describes the particulars of the "Automated Screening Printing" process provisionally selected at this point in time. "Automated Screening Printing" is a process whereby the printing device automatically selects and prints image data files from among a number of image data files stored on a memory card. From the display of FIG. 2 shown on the liquid crystal display 40, the user can operate the Select button group 586 (see FIG. 2) to select "Automated Screening Printing" and make the printer 1 execute "Automated Screening Printing."

Figure 3:
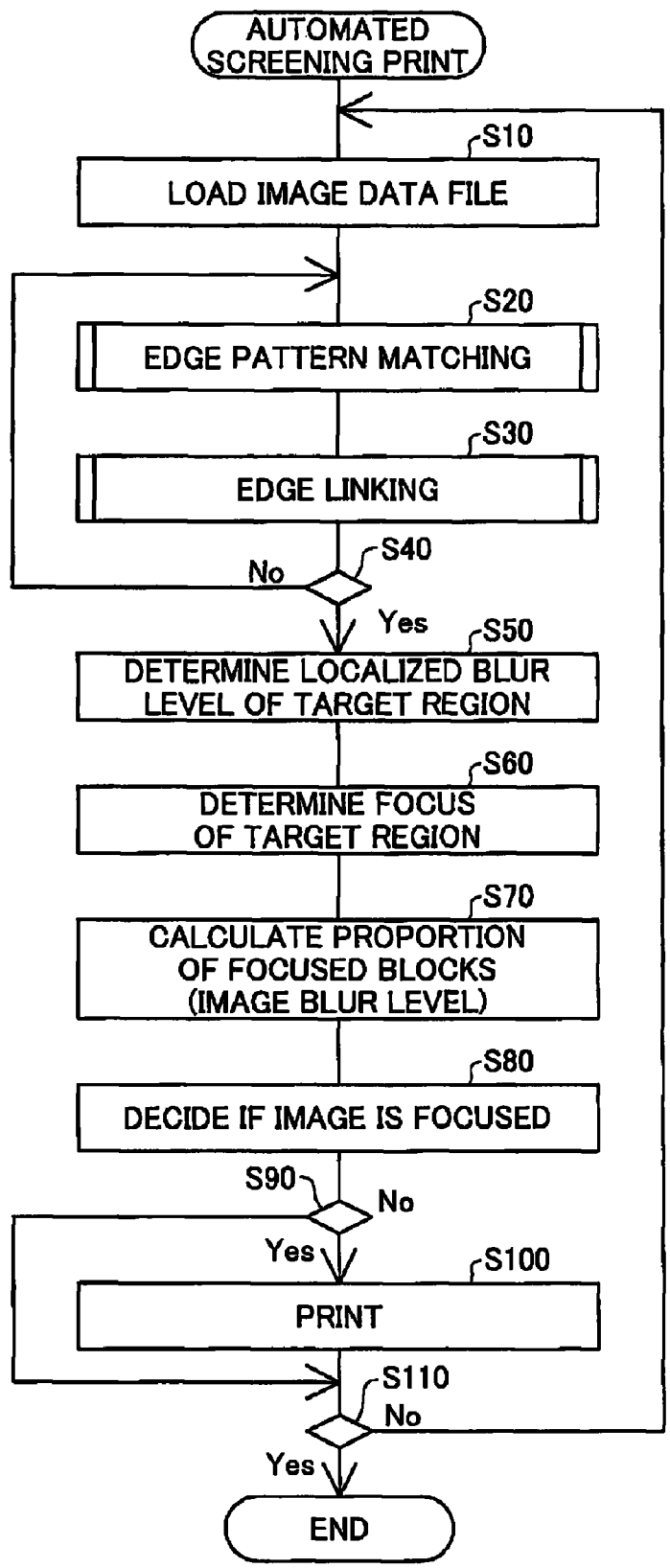
FIG. 3 is a flowchart depicting the specifics of the "Automated Screening Printing" process.

FIG. 3 is a flowchart depicting the specifics of the "Automated Screening Printing" process. FIG. 3 depicts the process carried out by the CPU 100 after the user has pressed the Color Printing button 601 or the Monochrome Printing button 602, in the state that the display of FIG. 2 is shown on the liquid crystal display 40.

In Step S10, the CPU 100 loads one of the image data files from the memory card MC into the main memory 150. The image data files read from the memory card are image data files of JPEG format. The CPU 100 function module having the functionality of Step S10 is depicted in FIG. 1 as a data acquiring module 110.

FIG. 4 is a diagram depicting DCT coefficients for an image of a target region in which image data is stored in JPEG format. Image data in JPEG format stores coefficients (DCT coefficients) F00-F77 representing frequency components of a number of discrete frequencies, for the image of each target region constituting a small region of 8×8 pixels obtained by dividing regions of an image. The DCT coefficients are derived by discrete cosine transform (DCT) of data representing luminance of the pixels of the image of the target region. A total of 64 DCT coefficients, i.e. [8 lines for frequency in the vertical direction]×[8 columns for frequency in the horizontal direction], are stored for each target region.

Black and white image data in JPEG format contains the aforementioned DCT coefficients for luminance. Color image data in JPEG format contains the respective DCT coefficients for the Y component (luminance), Cr component (red-green component), and Cb component (blue-yellow component).

In Step S320 of FIG. 3, edge pattern matching is carried out. The processes of Steps S20 and S30 are carried out in the horizontal direction and vertical direction of the image respectively. In the present embodiment, first, the processes of Steps S20 and S30 are carried out for the horizontal direction of the image, and then after the decision in Step S40, the processes of Steps S20 and S30 are carried out for the vertical direction of the image.

During edge pattern matching of Step S20, for target regions of 8×8 pixels of the image in the image data file, corresponding basic patterns are selected from among a plurality of basic patterns and associated with the target regions. During this time, the direction of change in luminance is determined as well. Furthermore, a horizontal localized blur level Bbh and a vertical localized blur level Bbv are calculated for each target region. Edge pattern matching will be discussed in more detail later. The CPU 100 function module having the edge pattern matching functionality of Step S20 is depicted in FIG. 1 as a basic pattern selecting module 120.

In Step S30, an edge linking process is carried out. In the edge linking process, a process like the following is carried out in relation to a boundary where a region of one color meets a region of another color in the image, i.e. the edge of an object having a color in the image.

First, examining a plurality of target regions in either the horizontal direction or the vertical direction, places (target regions) where color changes from one color to another are identified. A place where color changes from one color to another is specifically a boundary where a region of one color meets a region of another color. Consequently, such a boundary will be blurred to an extend exceeding the width of one target region (equivalent to 8 pixels). After such a target regions have been identified, the horizontal localized blur level Bbh and the vertical localized blur level Bbv of these target regions are modified. The edge linking process will be discussed in more detail later.

In Step S40, a decision is made as to whether the processes of Steps S20 and S30 have been carried out for both the horizontal and vertical directions of the image. In the event that the processes of Steps S20 and S30 have not yet been carried out for the vertical direction, the process returns to Step S20, and the processes of Steps S20 and S30 are carried out for the vertical direction. In the event that the processes of Steps S20 and S30 have been carried out for both of the horizontal and vertical directions of the image, the process advances to Step S50.

In Step S50, for each target region, the larger of the horizontal localized blur level Bbh and the vertical localized blur level Bbv of the target region is designated as the localized blur level Bb of the target region.

In Step S60, it is decided whether each target region is in-focus, that is, whether it is "a target region that is visually in focus." In Step S60, a target region whose localized blur level Bb is lower than a prescribed threshold value Thbb is decided to be "a target region that is visually in focus."

Hereinafter, a target region judged to be visually in focus will be termed a "focused region." On the other hand, a target region whose localized blur level Bb is equal to or greater than the prescribed threshold value Thbb will be judged to be "a target region that is visually out of focus." Hereinafter, a target region judged to be visually out of focus will be termed an "unfocused region."

"Planar regions" are another class of target region in addition to "focused regions" and unfocused regions." Determinations as to whether target regions are "planar regions" are made during edge pattern matching (Step S20) and the edge linking process (Step S30). A target region is deemed to be a "planar region" in the event that, for example, no boundary between colors is present within the target region. "Planar regions" will be discussed later.

In Step S70, a blur level Rf of the image is calculated on the basis of the number of focused regions in the image of the full image data. Specifically, the number Nf of focused regions in the image is divided by the sum of the number Nf of focused regions and the number Nn of unfocused regions to calculate the proportion Rf, as indicated by Expression (1) below. "Planar regions" are not taken into consideration during this time. The proportion Rf of focused regions is the blur level of the image of the image data file.

$$Rf=Nf/(Nf+Nn) \quad (1)$$

In Step S80, it is decided whether the image is focused, that is, whether it is "an image that is visually in focus." In Step S80, an image is judged to be "visually in focus" overall in the event that the image blur level Rf is equal to or greater than a prescribed threshold value Thrf. Hereinafter, an image judged to be visually in focus will be termed a "focused image." On the other hand, an image judged to be visually out of focus will be termed an "unfocused image." The CPU 100 function module having the functionality of Steps S30-S80 is depicted in FIG. 1 as a candidate designating module 130.

In Step S90, the process to be carried out subsequently is determined according to whether the image of the image data file currently targeted for process is a focused image or not. In the event that the image of the image data file is a focused image, in Step S100 the image of this image data file is printed out. If on the other hand the image of the image data file is an unfocused image, the process of Step S100 is skipped. The CPU 100 function module having the functionality of Step S100 is depicted in FIG. 1 as a printing module 110.

In Step S110, a decision is made as to whether the processes of Steps S10-S90 have been carried out for all of the image data files on the memory card. In the event that the memory card still contains any image data files not yet subjected to the processes of Steps S10-S90, the process again returns to Step S10. In Step S10, one image data file is read out from among the image data files not yet subjected to the processes of Steps S10-S90. On the other hand, if the processes of Steps S10-S90 have been carried out for all of the image data files on the memory card, the Automated Screening Printing process terminates.

By means of carrying the processes described in FIG. 3 above, the printer 1 can automatically select and print image data files of focused images only, from among the image data files on a memory card.

Figure 5:
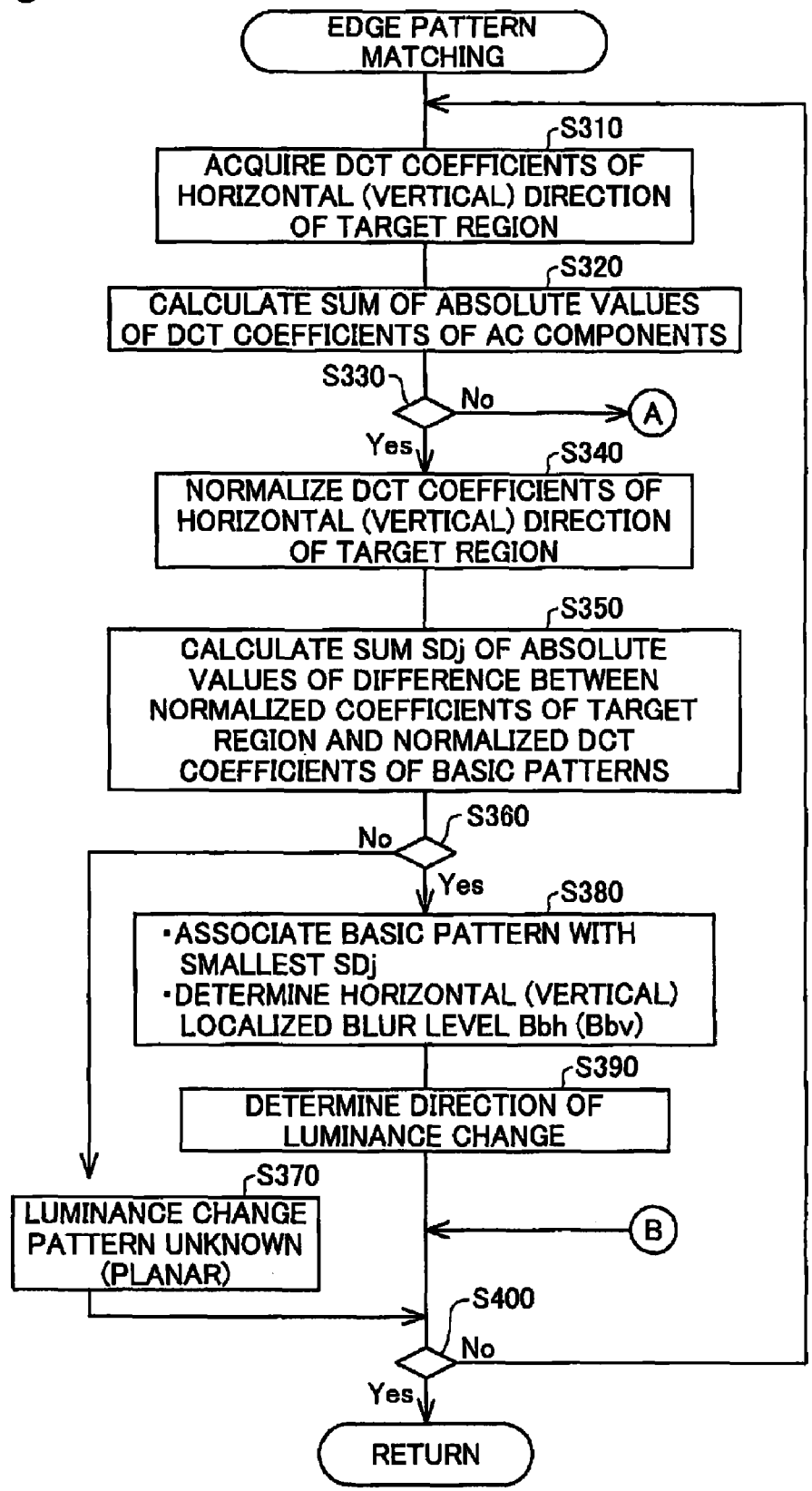
FIG. 5 is a flowchart showing the specifics of the edge pattern matching process.

FIG. 5 is a flowchart showing the specifics of the edge pattern matching process (see Step S20 of FIG. 3). Here, an example where edge pattern matching is carried out for the horizontal direction will be described. The edge pattern matching for the vertical direction would be carried out in the similar fashion as well.

First, the DCT coefficients of an image data file in JPEG format will be discussed further using FIG. 4. The DCT coefficient F00 corresponds to the average value of luminance in the target region (8×8 pixels). This coefficient F00 is termed the "DC component."

Meanwhile, the other 63 DCT coefficients F01-F77 are termed "AC components." These DCT coefficients F01-F77 represent frequency components when the density pattern of pixel luminance of a target region are approximated by superimposing cosine waves of different frequencies.

The seven DCT coefficients F01-F07 arrayed in the horizontal direction in the drawing represent frequency components obtained when the luminance density pattern in the horizontal direction, derived by respective averaging of pixel luminance levels of the target region for the vertical direction, is approximated by superimposing cosine waves of mutually different frequencies. In FIG. 4, coefficients further to the right represent frequency components of higher frequency, while coefficients further to the left represent frequency components of lower frequency.

Meanwhile, the seven DCT coefficients F10-F70 arrayed in the vertical direction in the drawing represent frequency components obtained when the luminance density pattern in the vertical direction derived by respective averaging of luminance of pixels of the target region for the horizontal direction is approximated by superimposing cosine waves of mutually different frequencies. In FIG. 4, coefficients further towards the bottom represent frequency components of higher frequency, while coefficients further towards the top represent frequency components of lower frequency.

In Step S330 of FIG. 5, the eight DCT coefficients F00-F07 of the horizontal direction of a given target region are acquired. Then, in Step S320, the sum Sfh of the absolute values of the DCT coefficients F01-F07 of the AC components is calculated.

$$Sfh = \sum_{i=1}^{7} |FOi| \quad (2)$$

In Step S330, it is decided whether Sfh is greater than a prescribed threshold value Thsf. In the event that Sfh is equal to or less than the threshold value Thsf, the process advances to Step S510 (see A in FIG. 5). The process starting from Step S510 will be discussed later. On the other hand in the event that Sfh is greater than the threshold value Thsf, the process advances to Step S340. Where Sfh is greater than the threshold value Thsf, this means that in the target region, luminance varies by more than a certain extent in the horizontal direction.

In Step S340, normalized coefficients Fr01-Fr07 are calculated on the basis of the DCT coefficients F01-F07 of the AC components of the horizontal direction of the target region. Fr01-Fr07 are derived through normalization of the absolute values of the DCT coefficients F01-F07, according to Eq. (3) below. Eq. (3) is an expression for calculating normalized coefficients Fr01-Fr07 corresponding to the respective DCT coefficients F01-F07 on the basis of the ratio of magnitude of the absolute values of the DCT coefficients F01-F07, in such a way that the sum is equal to 1. i denotes an integer from 1 to 7.

$$FrOi = \frac{|FOi|}{\sum_{k=1}^{7} |FOk|} \quad (i = 1 \sim 7) \quad (3)$$

The term "normalization" herein refers to this calculating of absolute values for a plurality of coefficients, and according to the ratio of magnitude of those absolute values, calculating new coefficients equal in number to the original coefficients, such that their sum is equal to 1.

Where two patterns of change of luminance are such that the changes in luminance have a vertically flipped relationship to one other, the respective corresponding DCT coefficients will have identical absolute values and opposite sign. This would apply, for example, to a combination of a first pattern in which "an area of constant luminance is at the left edge, with luminance increasing rightward from there" and a second pattern equivalent to the first pattern vertically flipped, in which "an area of constant luminance is at the left edge, with luminance decreasing rightward from there."

In the present embodiment, the absolute values of the DCT coefficients F01-F07 are normalized (see Step S340 of FIG. 5), followed by matching with basic patterns. Thus, by means of a single basic pattern, it is possible to carry out matching of two patterns whose changes in luminance have a vertically flipped relationship to one other. Specifically, according to the present embodiment, the number of basic patterns prepared for matching purposes can be fewer, in comparison to a mode in which basic patterns are respectively prepared to correspond to two patterns whose changes in luminance have a vertically flipped relationship to one other.

In Step S350, using Eq. (4) below, the sum SDj of the absolute values of difference between the normalized coefficients Fr0i (i=1-7) of the target region and the normalized DCT coefficients Cfnji of the basic pattern Pj of luminance change (j can assume the value 01-07, 11-15, 21-23, or 31) is calculated.

$$SDj = \sum_{i=1}^{7} |FrOi - Cfnji| \quad (4)$$

$(i = 01 \sim 07, 11 \sim 15, 21 \sim 23, 31)$

Figure 6:
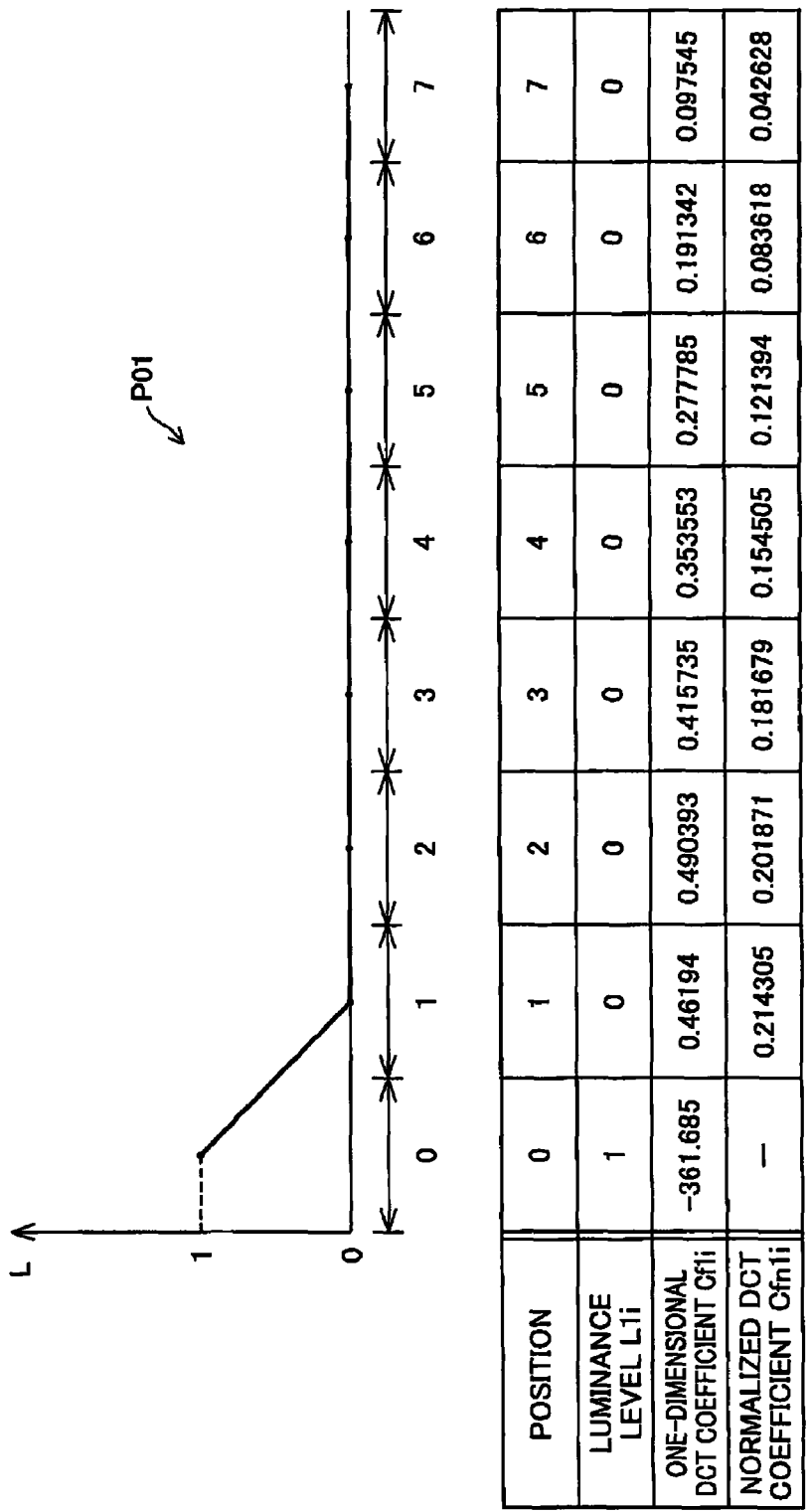
FIG. 6 shows luminance level Ll1, one-dimensional DCT coefficients Cfli, and normalized dimensional DCT coefficients Cfnli (i=1-7) of the basic pattern P01.

FIG. 6 is a diagram depicting luminance levels L1i of a basic pattern P01, one-dimensional DCT coefficients Cf1i, and normalized DCT coefficients Cfn1i (i=1-7). As shown at top in FIG. 6, the basic pattern P01 represents a pattern of change in luminance having a luminance level of 1 at pixel position 0, and luminance levels of 0 at pixel positions 1 to 7, and in which luminance level drops in linear fashion going from pixel position 0 to 1. This basic pattern P01 is represented by eight parameters which are discrete luminance levels L1i (i=1-7), shown at bottom in FIG. 10.

The eight parameters Cf1i (i=0-7) appearing in the second row of the table are one-dimensional DCT coefficients derived by performing one-dimensional DCT on luminance levels L1$i$ ($i$=1-7). The normalized DCT coefficients Cfn1$i$ are coefficients derived by normalization, according to Expression (5) below, of the absolute values of seven one-dimensional DCT coefficients ($i$=1-7) taken from among the eight one-dimensional DCT coefficients ($i$=0-7). In the example of FIG. 6, j=01.

$$Cfnji = \frac{|Cfji|}{\sum_{k=1}^{7}|Cfjk|} \quad (5)$$

$$\begin{pmatrix} i = 1 \sim 7 \\ j = 01 \sim 07, 11 \sim 15, 21 \sim 23, 31 \end{pmatrix}$$

These seven normalized DCT coefficients Cfn1$i$ for the basic patterns Pj (j is 01-07, 11-15, 21-23, 31) have been previously stored in the ROM 160 (see FIG. 1). These normalized DCT coefficients Cfnj are used in the operation of Eq. (4).

Figure 7:
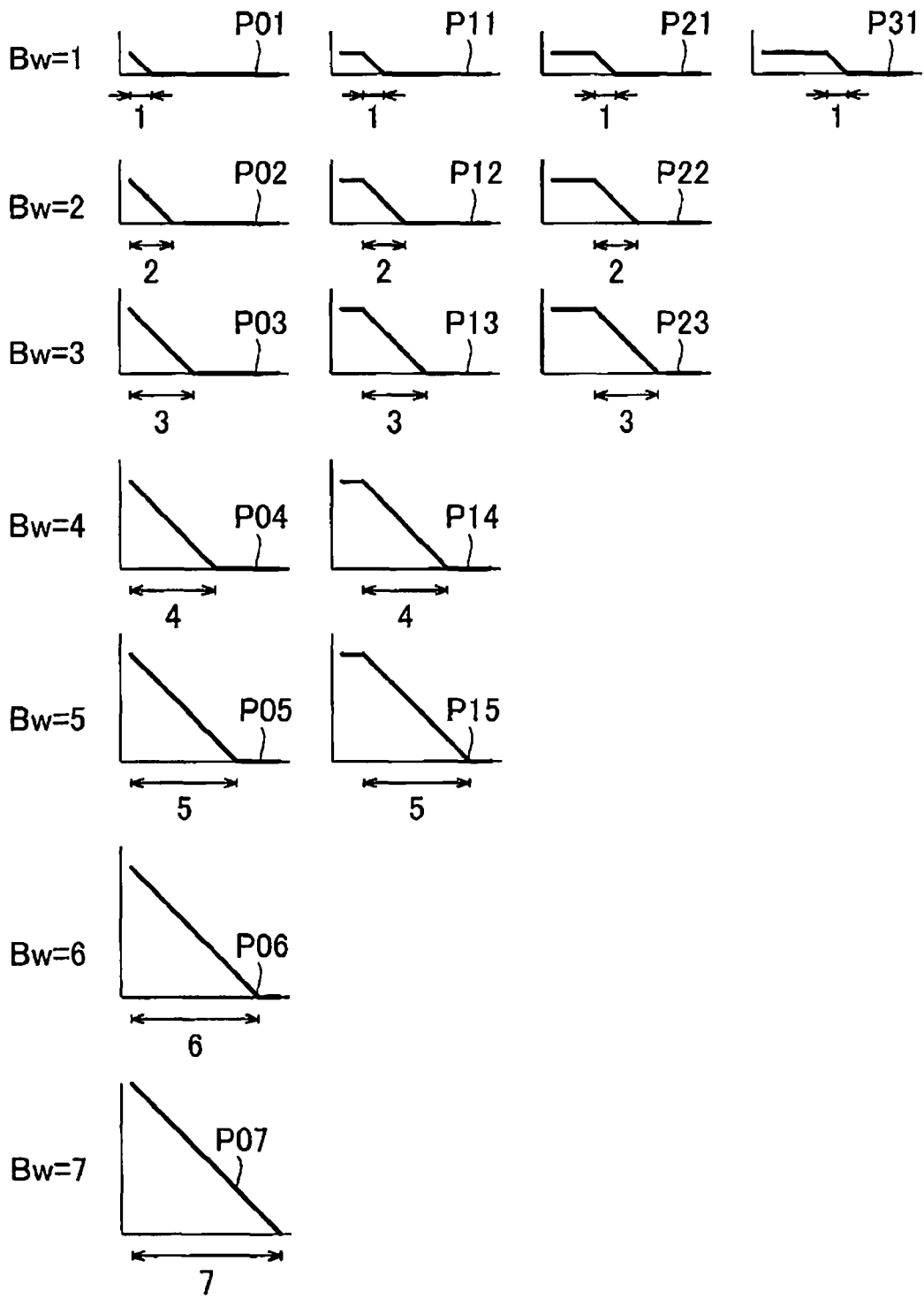
FIG. 7 shows 16 basic patterns of luminance change (j=01-07, 11-15, 21-23, 31)
Figure 10:
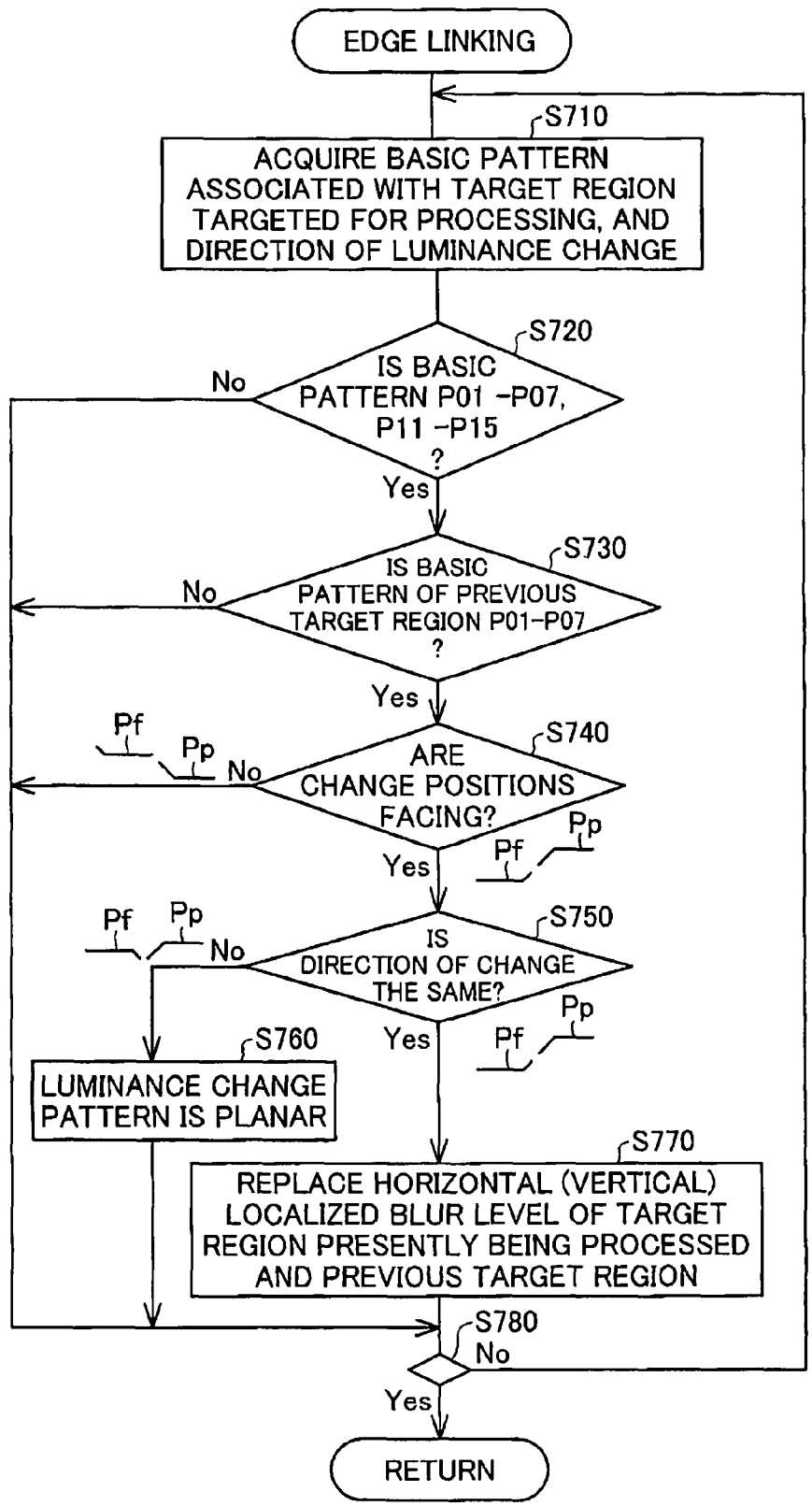
FIG. 10 is a flowchart showing the specifics of the edge linking process in Step S30 of FIG. 3.

FIG. 7 is a diagram depicting 16 basic patterns Pj of luminance change (j is 01-07, 11-15, 21-23, 31). In each basic pattern Pj, the vertical axis represents luminance level and the horizontal axis represents pixel position. The basic patterns Pj shown in FIG. 6, like the pattern P01 shown at top in FIG. 10, represent luminance levels at eight pixel positions. For example, the basic pattern P02 is a pattern having a luminance level of 2 at pixel position 0 and a luminance level of 0 at pixel positions 2 to 7, with the luminance level declining in straight-line fashion from pixel position 0 to 2. The basic pattern P07 is a pattern having a luminance level of 7 at pixel position 0 and a luminance level of 0 at pixel position 7, with the luminance level declining in straight-line fashion from pixel position 0 to 7.

The basic patterns P01, P11, P21, P31 shown in the top row of FIG. 7 are basic patterns in which luminance level declines in straight-line fashion from left to right. Blur width Bw=1 is associated with these basic patterns. In basic pattern P01, the position at which luminance level declines is the leftwardmost position (pixel positions 0-1), while in basic pattern P31, the position at which luminance level declines is the rightwardmost position (pixel positions 3-4). In basic patterns P01, P11, P21, P31, the position at which luminance level declines shifts further rightward, in the order in which the patterns are arrayed.

Blur width Bw equivalent to the pixel count (in FIG. 7, indicated below each basic pattern Pj) of a region of change (decline) in luminance level is assigned in similar fashion to the other basic patterns of FIG. 7. If color differs between neighboring regions in an image, the regions will typically differ in luminance as well. Blur width Bw represents the blur level in a boundary area between regions of different color.

In FIG. 7, basic patterns having equal assigned blur width Bw are depicted arrayed in the horizontal direction. Of the basic patterns depicted arrayed in the horizontal direction, in those shown further to left the position of decline in luminance level is shifted further leftward. The basic patterns Pj do not overlap even if flipped vertically or sideways.

After calculation of the sum SDj of the absolute values of difference between the normalized coefficients Fr0$i$ ($i$=1-7) of the target region and the normalized DCT coefficients Cfnji of the basic pattern Pj of luminance change in Step S350 of FIG. 5 (see Eq. (4) above), in Step S360 it is decided whether there exists a basic pattern Pj such that SDj is less than a prescribed threshold value Thsd.

In the event there exists no basic pattern Pj such that SDj is less than a prescribed threshold value Thsd, in Step S370 the basic pattern associated with the target region will be designated as "unknown," and the pattern of luminance change of the target region will be designated as "planar." Such a target region is a "planar region" (see the processes of Steps S60-S80 of FIG. 3). Then, after Step S370, the process of Step S400 will be carried out, without carrying out the processes of Steps S380 and S390.

On the other hand, in the event there exists basic pattern Pj such that SDj is less than a prescribed threshold value Thsd, in Step S380 the basic pattern affording the smallest SDj will be associated with the target region. The blur width Bw of the associated basic pattern (see FIG. 7) will be designated as the horizontal localized blur level Bbh of the target region.

Where the basic pattern affording the smallest SDj with respect to the normalized coefficients Fr0$i$ ($i$=1-7) of the target region is denoted as basic pattern Pmat, the pattern of luminance change of the target region will be most similar to the basic pattern Pmat, or to a pattern of luminance change derived by flipping the basic pattern Pmat either vertically or sideways. Here, "most similar" means greater similarity than other basic patterns or patterns derived by flipping other basic patterns vertically or sideways.

Next, in Step S390 of FIG. 5, the direction of the pattern of luminance change of the target region is determined.

FIG. 8 is a table depicting relationships between direction of pattern luminance change and sign of the DCT coefficients. In FIG. 8, the example of basic pattern P01 is shown. In the event that the pattern of luminance change in the target region has the same direction as the basic pattern P01 (P01$a$ in FIG. 8), the sign of the DCT coefficient F01 of the target region is positive (indicated by a "+" in the drawing). The sign of the DCT coefficient F02 of the target region is the same as the sign of the DCT coefficient F01 of the target region (indicated by a "=" in the drawing), and is therefore positive.

As shown in FIG. 8, the pattern P01$a$ which is identical to the basic pattern P01, and the patterns P01$b$-P01$d$ derived by flipping the basic pattern P01 left to right and top to bottom respectively, differ from one another in terms of the combination of sign (+/−) of the DCT coefficient F01, with identity/difference (=/≠) between the signs of the DCT coefficients F01 and F02. Here, the basic pattern P01 is shown by way of example, but the other basic patterns Pj are similar. For this reason, the direction of the pattern of luminance change can be determined on the basis of the signs of the DCT coefficients F01 and F02 of the target region in Step S290 in FIG. 5.

In Step S400 of FIG. 5, it is decided whether the processes of Steps S310-S390 have been executed for all of the target regions. If there are any target regions for which the processes of Steps S310-S390 have not yet been executed, the process returns to Step S310. In Step S310, a target region that has not yet to be processed is selected, and its DCT coefficients F00-F07 are acquired. On the other hand, if the processes of Steps S310-S390 have been executed for all of the target regions, the edge pattern matching process terminates.

Where edge pattern matching is carried out for the horizontal direction, as a general rule the sequence of processing of the target regions will go from left to right in the image, with processing of a target region at the right edge being followed by processing of the target region at the left edge in the next row beneath. Where edge pattern matching is carried out for the vertical direction, as a general rule the sequence of processing of the target regions will go from top to bottom in the image, with processing of a target region at the bottom edge being followed by processing of the target region at the top edge in the next row to the right.

Figure 9:
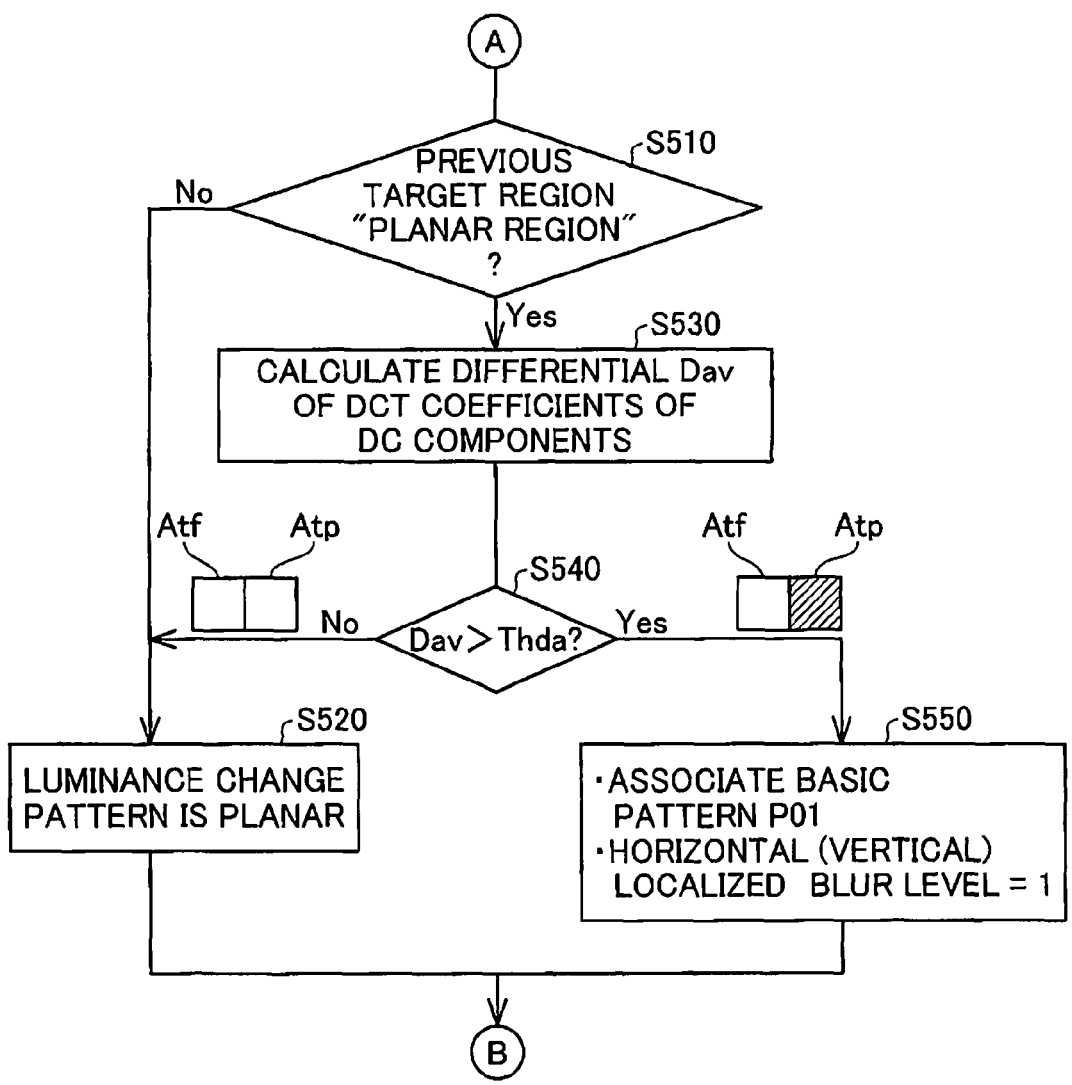
FIG. 9 is a flowchart showing the specifics of a process executed in the event that the decision result of Step S330 of FIG. 5 is No.

FIG. 9 is a flowchart showing the specifics of a process executed in the event that the decision result of Step S330 of FIG. 5 is No. The process of FIG. 9 is executed in the event that the sum Sfh of the absolute values of the DCT coefficients F01-F07 of the AC components is equal to or less than the prescribed threshold value Thsf (Step S330). Where Sfh is equal to or less than the threshold value Thsf, this means that in the target region, luminance varies by no more than a certain extent in the horizontal direction.

In Step S510, it is decided whether the target region Atf processed just before to the target region Atp presently being processed is a "planar region."

In the event that the target region Atf processed just before to the target region Atp presently being processed was not a "planar region," in Step S520, the pattern of luminance change of the target region Atp presently being processed is designated as "planar." That is, the target region Atp is designated to be a "planar region."

The process will advance from Step S510 to Step S520 even in the event that the target region presently being processed is a target region at the beginning (left edge) of a row. In the event that the target region presently being processed is a target region at the beginning (left edge) of a row, the target region Atf processed just before is the target region at the right end of row just above, not the target region to the left of the target region Atp presently being processed.

Where processing is being carried out for the vertical direction, the process will advance from Step S510 to Step S520 even in the event that the target region presently being processed is a target region at the beginning (top edge) of a column. In the event that the target region presently being processed is a target region at the beginning (top edge) of a column, the target region Atf processed just before is the target region at the bottom end of row just to the left, not the target region above the target region Atp presently being processed.

If on the other hand the target region Atf processed just before is a "planar region," in Step S530 the difference Dav between the respective DCT coefficients F00 of the target region Atp presently being processed and the target region Atf processed just before is calculated. Dav represents the difference in average value of the target region Atp presently being processed and the target region Atf processed just before. Then, in Step S540, it is decided whether Dav is greater than a prescribed threshold value Thda.

In the event that Dav is equal to or less than the prescribed threshold value Thda, in Step S520 the pattern of luminance change of the target region Atp presently being processed will be deemed to be "planar." This means that neither the image of the target region Atp presently being processed or the image of the target region Atf processed just before contain a color boundary, and that both are represented with similar luminance levels. A model diagram representing such a state is shown to the left of Step S540.

On the other hand, in the event that Dav is greater than the prescribed threshold value Thda, in Step S550 the basic pattern P01 is associated with the target region Atp presently being processed. The horizontal localized blur level Bbh of the target region Atp presently being processed is then deemed to be 1, which is the blur width Bw of the basic pattern P01. This means that the image of the target region Atp presently being processed and the image of the target region Atf processed just before are represented with dissimilar luminance levels. Specifically, it means that the boundary of the target region Atp and the target region Atf coincides with a border between colors. A model diagram representing such a state is shown to the right of Step S540.

By carrying out the processes of Steps S510-S550 described above, it is possible to determine blur width even in instances where the edge of a color region in an image is located at the border of neighboring target regions, not inside any of the target regions (see the right side of Step S540 of FIG. 9).

After Step S520 or Step S550, the process advances to Step S400 of FIG. 5 (see FIG. 9 and B or FIG. 5). The specifics of the edge pattern matching process are as described above.

The preceding discussion of the specifics of the edge pattern matching process (see FIGS. 5 to 9) takes the example of processing for the horizontal direction. However, processing would be carried out in similar fashion for the vertical direction as well.

FIG. 10 is a flowchart showing the specifics of the edge linking process in Step S30 of FIG. 3. While the edge linking process will be described here taking the example of processing for the horizontal direction, the edge linking process would be carried out similarly for the vertical direction as well.

Where the edge linking process is carried out for the horizontal direction, as a general rule the sequence of processing of the target regions will go from left to right in the image, with processing of a target region at the right edge being followed by processing of the target region at the left edge in the next row beneath. Where the edge linking process is carried out for the vertical direction, as a general rule the sequence of processing of the target regions will go from top to bottom in the image, with processing of a target region at the bottom edge being followed by processing of the target region at the top edge in the next row to the right.

In Step S710 of FIG. 10, a basic pattern associated with a given target region, and the direction of the pattern of luminance change, are acquired (see Steps S380, S390).

In Step S720, it is examined whether the basic pattern associated with the target region is P01-P07 or P11-P15 (see FIG. 7). The basic patterns P01-P07 are basic patterns in which the position of change in luminance is at the left edge of the pattern. The basic patterns P11-P15 are basic patterns having an area of constant luminance equivalent to one pixel situated at the left edge, with luminance starting to change at a pixel position to the right thereof. In the event that the basic pattern associated with the target region is neither P01-P07 nor P11-P15, the process advances to Step S780.

In Step S720, if the basic pattern associated with the target region is P01-P07 or P11-P15, the process advances to Step S730. In Step S730, it is examined whether the basic pattern associated with the target region Atf processed just before is one of the basic patterns P01-P07. In the event that the examination outcome is No, the process advances to Step S780. The process will advance from Step S730 to Step S780 even in the event that the target region presently being processed is a target region at the beginning (left edge) of a row.

In the event that the basic pattern associated with the target region Atf processed just before is one of the basic patterns P01-P07, the process will advance to Step S740. In Step S740, it is examined whether the position at which luminance changes in the target region Atp presently being processed and the target region Atf processed just before are facing one another. The target region Atf processed just before is the neighboring target region situated to the left of the target region Atp presently being processed. In the event that the examination outcome is No, the process advances to Step S780.

For example, if the position at which luminance changes is situated at the left edge in both the target region Atf and the target region Atp, the examination outcome of Step S740 will be No. A model diagram depicting such an instance, using the luminance change pattern Pf of the target region Atf and the luminance change pattern Pp of the target region Atp, is shown to the left of Step S740 in FIG. 10. A model diagram depicting an instance where, on the other hand, the positions at which luminance change in the target region Atf and the target region Atp are facing one another is shown to the lower right of Step S740.

In Step S740, in the event that the positions at which luminance change in the target region Atp presently being processed and the target region Atf processed just before are facing one another, the process will advance to Step S750. In Step S750, it is examined whether the direction of luminance change in the target region Atp presently being processed is coincident with the direction of luminance change in the target region Atf processed just before. "Coincident direction of luminance change" refers to the case where luminance declines from left to right in each, or where luminance increases from left to right in each. In the event that the examination outcome is No, the process advances to Step S760.

In the case that the examination outcome in Step S750 is No, this will corresponds to the case where luminance changes in "V" or "Ë" pattern to either side of the boundary of symmetrical regions. For example, where luminance decreases from left to right in the target region Atf, while luminance increases from left to right in the target region Atp, the luminance change will be "V" shaped and the examination outcome in Step S750 will be No. A model diagram depicting such an instance is shown to the left of Step S750 in the drawing. A model diagram depicting an instance in which, on the other hand, the direction of luminance change is coincident between the target region Atf and the target region Atp is shown to the lower right of Step S750 in the drawing.

In Step S760, the pattern of luminance change of the target region is replaced with "planar." That is, the target region is designated to be a "planar region." The horizontal localized blur level Bbh of the target region (see Step S380 of FIG. 5) is then cleared. By carrying out this process it is possible to classify target regions with finely fluctuating luminance level as planar regions. As a result, it is possible to exclude target regions with finely fluctuating luminance level when making the decision as to whether an image is focused (see Steps S60-S80 of FIG. 3).

In cases where human hair or animal fur appears in a photograph, there will be fine fluctuations of luminance level in these areas. Thus, target regions in which human hair or animal fur appears will have lower localized blur level Bb (see Step S50 of FIG. 3). As a result, in cases where human hair or animal fur appears in regions to more than a certain extent in a photographic image, there is a possibility that in the processes of Steps S70 and S80 of FIG. 3, such images will always be judged as being focused images. However, in the present embodiment, by means of carrying out the processes of Steps S750 and S760, these sorts of target regions can be designated as planar regions and excluded from the focus determination. Thus, focus determination for an image can be carried out accurately.

In Step S750 of FIG. 10, in the event that the direction of luminance change of the target region Atp presently being processed is coincident with the direction of luminance change of the target region Atf processed just before, the process advances to Step S770. That is, the process of Step S770 is performed in cases where the interval of change in luminance in a first selected basic pattern selected on the basis of a target region presently targeted for processing, and the interval of change in luminance in a second selected basic pattern selected on the basis of a target region processed just before, are situated at the edge thereof lying towards the other target region, and with the direction of luminance change being the same.

In Step S770, the horizontal localized blur level Bbh of the target region Atp presently being processed and the target region Atf processed just before is replaced by a new value. Specifically, the sum of the blur width Bw of the basic pattern associated with the target region Atp and the blur width Bw of the basic pattern associated with the target region Atf is designated to be the new horizontal localized blur level Bbh of the target region Atp and the target region Atf.

In Step S780, it is determined whether the processes of Steps S710-S770 have been executed for all of the target regions. If there are any target regions for which the processes of Steps S710-S770 have not yet been executed, the process returns to Step S710. In Step S710, a target region that has not yet to be processed is selected, and the basic pattern associated with the target region and the direction of its pattern of luminance change are acquired. On the other hand, if the processes of Steps S710-S770 have been executed for all of the target regions, the edge linking process terminates.

By means of carrying out the edge linking process described above, blur width can be determined accurately, even in instances where the edge (contour) of a color region in an image extends through multiple target regions.

During calculation of the pattern of luminance change of target regions in an image, there may be instances in which, despite the fact that luminance actually varies continuously across target regions, a region of constant luminance equivalent to one pixel is produced at the edge of a region (i.e. at a boundary between target regions) due to processing error. However, in the edge linking process of the present embodiment, an instance in which a region of constant luminance equivalent to one pixel is produced at the edge of a region will be treated in the same way as in the case where luminance varies continuously (see Step S720 of FIG. 10). Specifically, the edge linking process of Step S770 is also directed to instances where the basic pattern associated with the target region presently being processed is one of the basic patterns P11-P15 having an area of constant luminance equivalent to one pixel situated at the left edge, with luminance starting to change at a pixel position to the right thereof Consequently, blur width of edges (contours) of color regions in an image can be determined correctly.

The preceding discussion of the specifics of the edge linking process takes the example of processing for the horizontal direction. However, processing would be carried out in similar fashion for the vertical direction as well.

Where the process is carried out for the vertical direction, a process such as the following will be carried out when handling data of the target region processed just before (see Step S730 of FIG. 10). Specifically, in the edge linking process, in the event that the target region being processed is a target region at the beginning (top edge) of a column, the process will advance from Step S730 to S780. Where the target region presently being processed is a target region at the beginning (top edge) of a column, the target region Atf processed just before is the target region at the bottom end of row just to the left, not the target region above the target region Atp presently being processed.

B. Embodiment 2

In Embodiment 2, the basic patterns stored in the ROM 160 (see FIG. 7) differ from those in Embodiment 1. Additionally, the edge pattern matching process (see S30 of FIG. 3 and FIG.

5) in Embodiment 2 differs in part from that in Embodiment 1. Furthermore, in Embodiment 2, where the luminance differential in an area of a color boundary is equal to or less than a prescribed value, it is treated as if there were no luminance differential. In other respects, Embodiment 2 is the same as Embodiment 1. The following discussion of Embodiment 2 will focus on the points of difference from Embodiment 1.

FIGS. 11 to 14 are diagrams depicting basic pattern groups PGa-PGd respectively containing 16 basic patterns of luminance change. The notation method in FIGS. 11 to 14 is the same as in FIG. 7. In FIGS. 11 to 14, basic patterns of BW=3 to 6 (corresponding to j=03-06, 13-15, 23) have been omitted for the simplicity.

Figure 11:
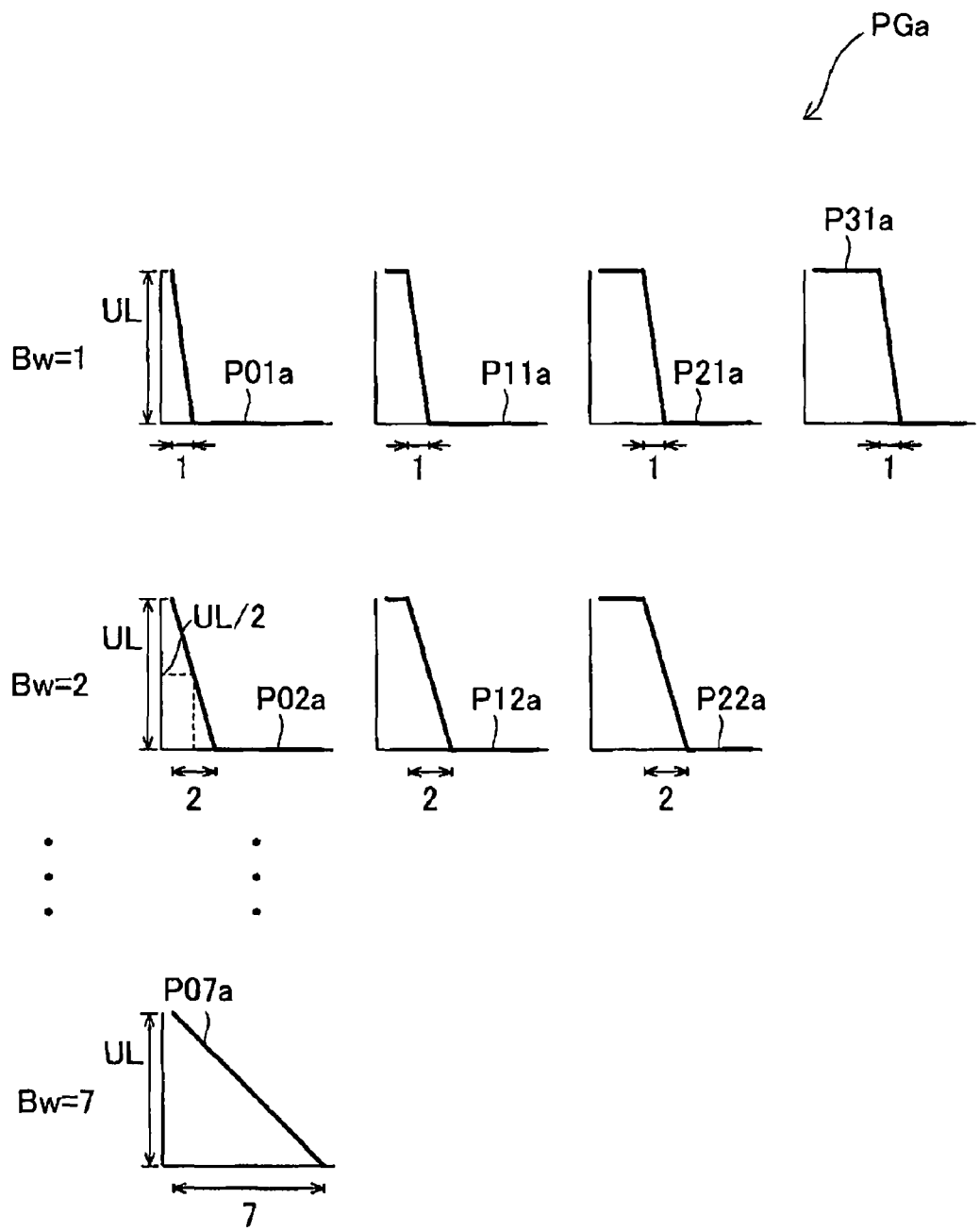
FIG. 11 depicts a basic pattern group PGa containing 16 basic patterns of luminance change.

The basic patterns Pja (j represents 01-07, 11-15, 21-23, 31) of the basic pattern group PGa shown in FIG. 11 are basic patterns having mutually equal differentials between maximum luminance and minimum luminance. The magnitude of this luminance differential is denoted as unit luminance differential UL. Unit luminance differential UL can be a quantity equivalent to luminance of 1, for example. In other respects the basic patterns Pja of the basic pattern group PGa are the same as the basic patterns Pj (see FIG. 7) of Embodiment 1. The basic pattern group PGa is a group of basic patterns of luminance change decreasing towards the right in a first pixel position or first pixel positions on the left, with luminance being constant at pixel positions to the right of the first pixel position.

For example, in Embodiment 1, as shown in FIG. 6 luminance levels $L01li$ (i=0-7) at pixel positions i (i=0-7) of the basic pattern P01 are 1, 0, 0, 0, 0, 0, 0 in that order. On the other hand, luminance levels $L01ai$ (i=0-7) at pixel positions i (i=0-7) of the basic pattern P01a shown at upper left in FIG. 11 are UL, 0, 0, 0, 0, 0, 0 in that order (see FIG. 6). Also, luminance levels $L02ai$ (i=0-7) at pixel positions i (i=0-7) of the basic pattern P02a shown below basic pattern P01a in FIG. 11 are UL, UL/2, 0, 0, 0, 0, 0 in that order.

Signed normalized DCT coefficients Cfsjai (j=01-07, 11-15, 21-23, 31; i=0-7) of the basic patterns Pja are stored in the ROM 160 in the printer 1. These signed normalized DCT coefficients Cfsjai, like the normalized DCT coefficients Cfnji of Embodiment 1, are derived from Ljai of the basic patterns Pja (j=01-07, 11-15, 21-23, 31; i=0-7)

Specifically, the one-dimensional DCT coefficients Cfjai (i=0-7) are derived by performing one-dimensional DCT on the luminance level Ljai (i=0-7). Then, the absolute values of seven of the one-dimensional DCT coefficients Cfjai from among the eight one-dimensional DCT coefficients Cfjai are subjected to "signed normalization" with Eq. (6) below, to derive the signed normalized DCT coefficients Cfsjai (see FIG. 6). The numerator in the right-hand term of Eq. (6) has no absolute value symbol.

$$Cfsjai = \frac{Cfjai}{\sum_{k=1}^{7} |Cfjak|} \quad (6)$$

$$\begin{pmatrix} i = 1 \sim 7 \\ j = 01 \sim 07, 11 \sim 15, 21 \sim 23, 31 \end{pmatrix}$$

This technique of dividing each of a plurality of coefficients by the sum of the absolute values of the coefficients to calculate "a plurality of new coefficients equal in number to the original coefficients, such that the sum of their absolute values is equal to 1" is herein termed "signed normalization."

Also stored in the ROM 160 of the printer 1 is the sum Sja of the absolute values of the one-dimensional DCT coefficients Cfjai (i=1-7) constituting the AC components from among the one-dimensional DCT coefficients Cfjai of the basic patterns Pja. Sja is calculated with Eq. (7) below.

$$Sja = \sum_{i=1}^{7} |Cfjai| \quad (7)$$

$$(i = 01 \sim 07, 11 \sim 15, 21 \sim 23, 31)$$

Figure 12:
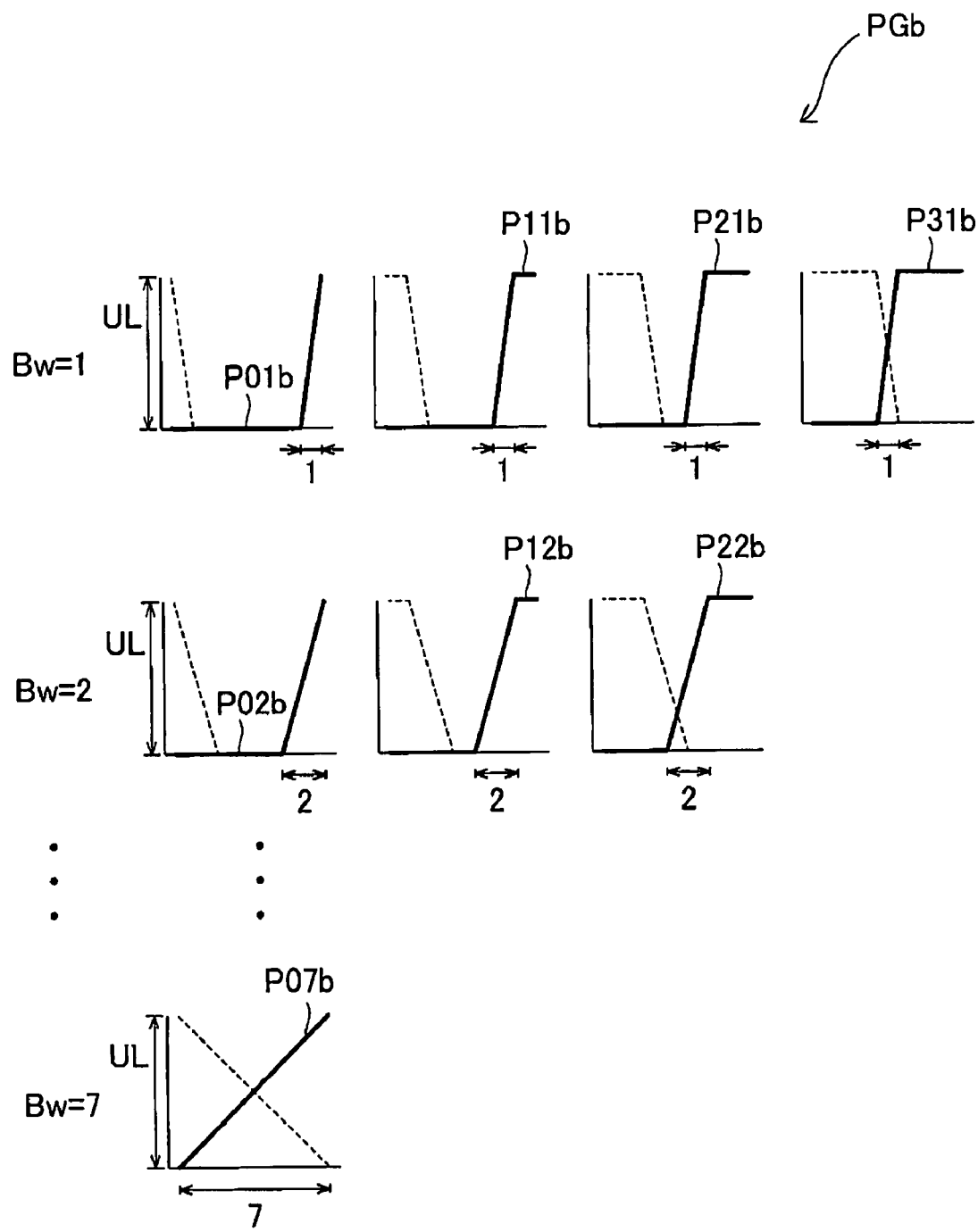
FIG. 12 depicts a basic pattern group PGb containing 16 basic patterns of luminance change.

The basic patterns Pjb (j=01-07, 11-15, 21-23, 31) of the basic pattern group PGb shown in FIG. 12 are patterns derived by respective sideways flipping of the basic patterns Pja (j=01-07, 11-15, 21-23, 31) of the basic pattern group PGa. For reference, the basic patterns Pja of the basic pattern group PGa are shown by broken lines in FIG. 12. The basic pattern group PGb is a group of basic patterns of luminance change increasing towards the right in a first pixel position or first pixel positions on the right, with luminance being constant at pixel positions to the left side of the first pixel position.

The signed normalized DCT coefficients Cfsjbi (i=1-7) of the basic patterns Pjb of the basic pattern group PGb are derived by respectively reversing the +/− sign of the odd-numbered components, from among the signed normalized DCT coefficients Cfsjai (i=1-7) of the basic patterns Pja of the basic pattern group PGa.

Figure 13:
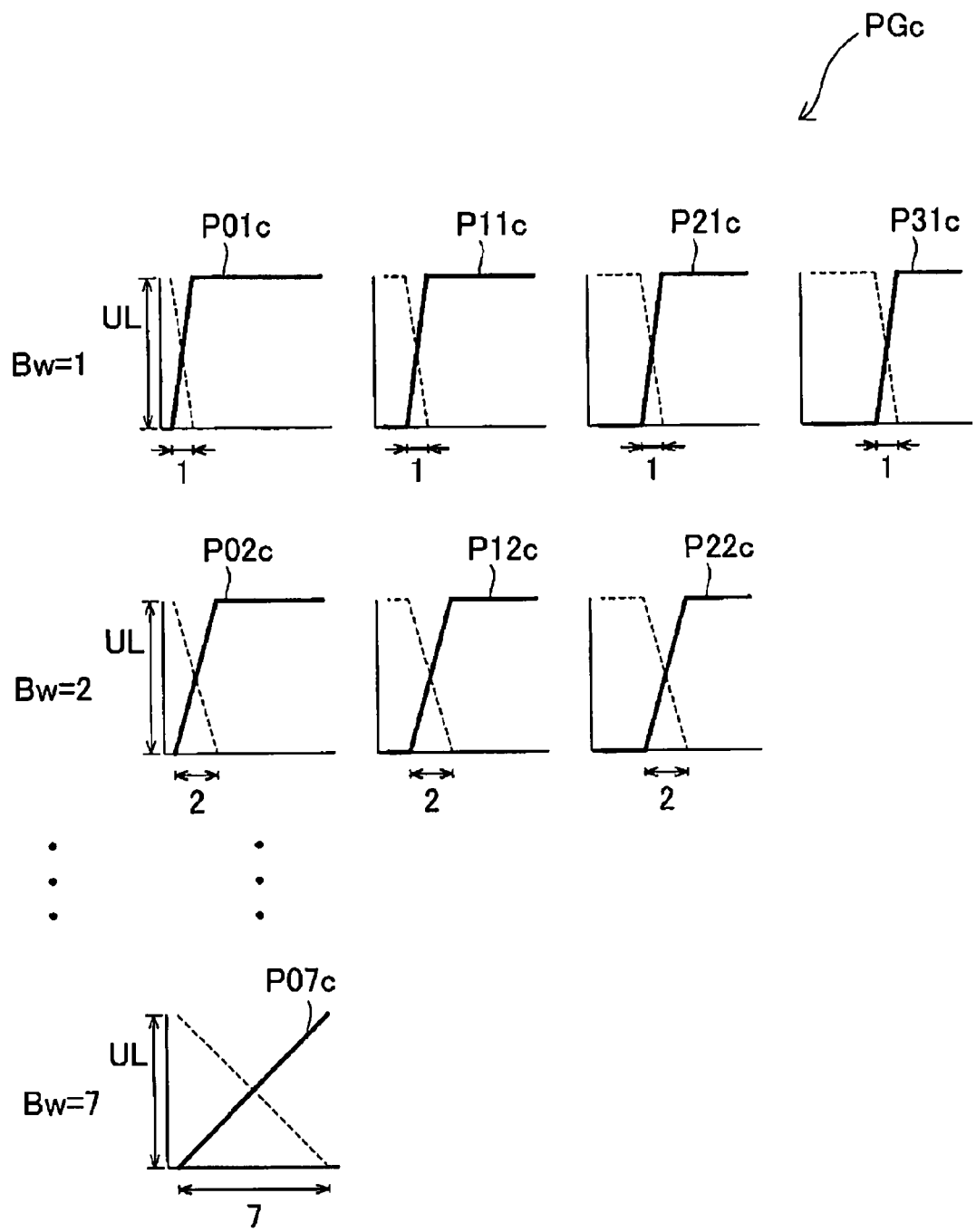
FIG. 13 depicts a basic pattern group PGc containing 16 basic patterns of luminance change.

The basic patterns Pjc (j=01-07, 11-15, 21-23, 31) of the basic pattern group PGc shown in FIG. 13 are patterns derived by respective vertical flipping of the basic patterns Pja (j=01-07, 11-15, 21-23, 31) of the basic pattern group PGa. For reference, the basic patterns Pja of the basic pattern group PGa are shown by broken lines in FIG. 13. The basic pattern group PGc is a group of basic patterns of luminance change increasing towards the right in a first pixel position or first pixel positions on the right, with luminance being constant at pixel positions to the right side of the first pixel position.

The signed normalized DCT coefficients Cfsjci (i=1-7) of the basic patterns Pjc of the basic pattern group PGc are derived by reversing the +/− sign of the signed normalized DCT coefficients Cfsjai (i=1-7) of the basic patterns Pja of the basic pattern group PGa.

Figure 14:
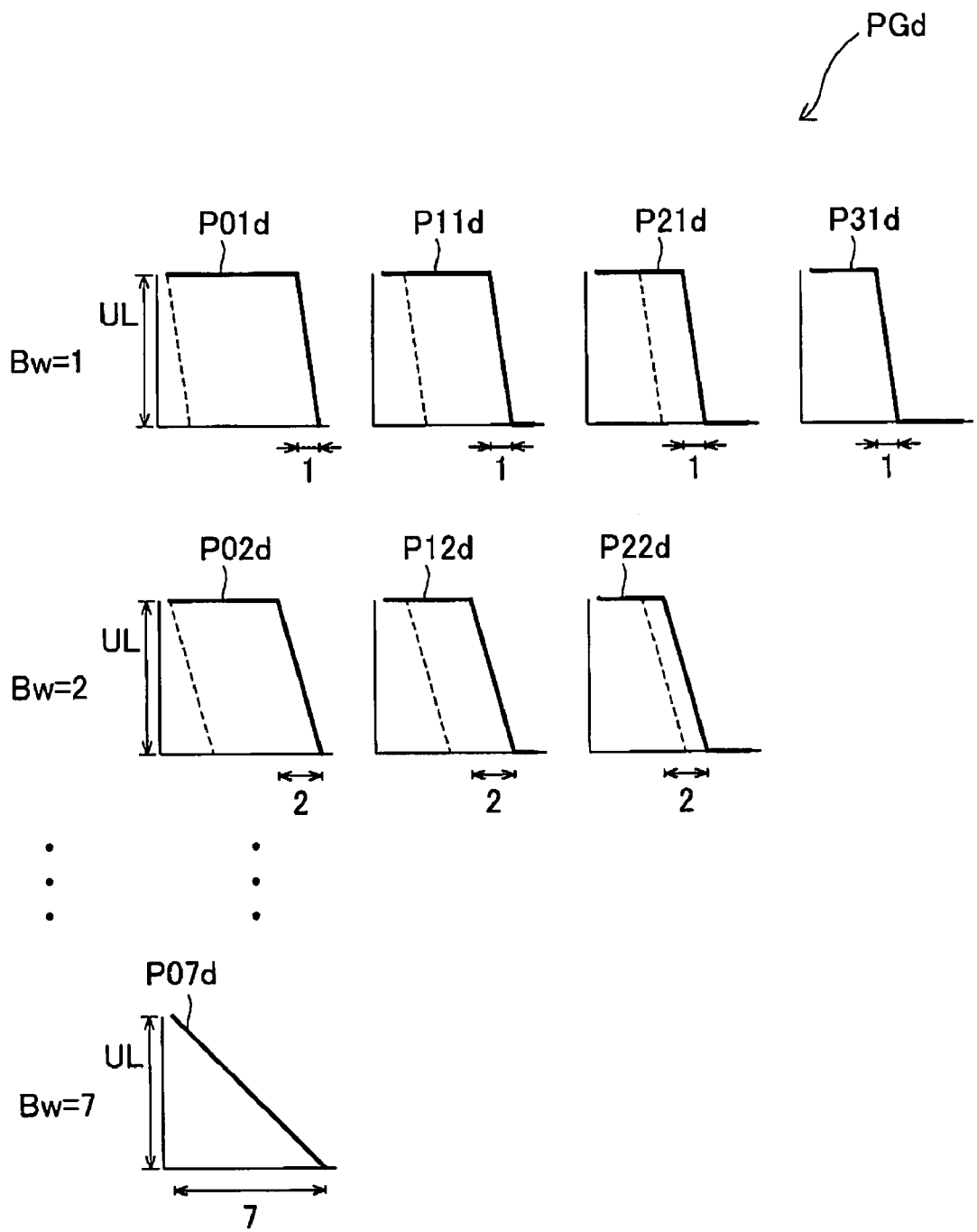
FIG. 14 depicts a basic pattern group PGd containing 16 basic patterns of luminance change.

The basic patterns Pjd (j=01-07, 11-15, 21-23, 31) of the basic pattern group PGd shown in FIG. 14 are patterns derived by respective sideways and vertical flipping of the basic patterns Pja (j=01-07, 11-15, 21-23, 31) of the basic pattern group PGa. For reference, the basic patterns Pja of the basic pattern group PGa are shown by broken lines in FIG. 14. The basic pattern group PGd is a group of basic patterns of luminance change decreasing towards the right in a first pixel position or first pixel positions on the right, with luminance being constant at pixel positions to the left side of the first pixel position.

The signed normalized DCT coefficients Cfsjdi (i=1-7) of the basic patterns Pjd of the basic pattern group PGd are derived by respectively reversing the +/− sign of the odd-numbered components, from among the signed normalized DCT coefficients Cfsjai (i=1-7) of the basic patterns Pja of the basic pattern group PGa, and then reversing the sign of all of the components. That is, the signed normalized DCT coefficients Cfsjdi (i=1-7) of the basic patterns Pjd of the basic pattern group PGd are derived by reversing the +/− sign of the even-numbered components, from among the signed normalized DCT coefficients Cfsjai (i=1-7) of the basic patterns Pja of the basic pattern group PGa.

Also stored in the ROM 160 of the printer 1 are the signed normalized DCT coefficients Cfsjbi, Cfsjci, Cfsjdi and the sums Sjb, Sjc, Sjd of the absolute values of the AC components, for the basic patterns Pjb, Pjc, Pjd of these basic pattern groups PGb, PGc, PGd as well (j=01-07, 11-15, 21-23, 31; i=1-7)). Methods for calculating the signed normalized DCT coefficients Cfsjbi, Cfsjci, Cfsjdi and the sums Sjb, Sjc, Sjd of the absolute values of the AC components are the same as those for the basic pattern group PGa.

Figure 15:
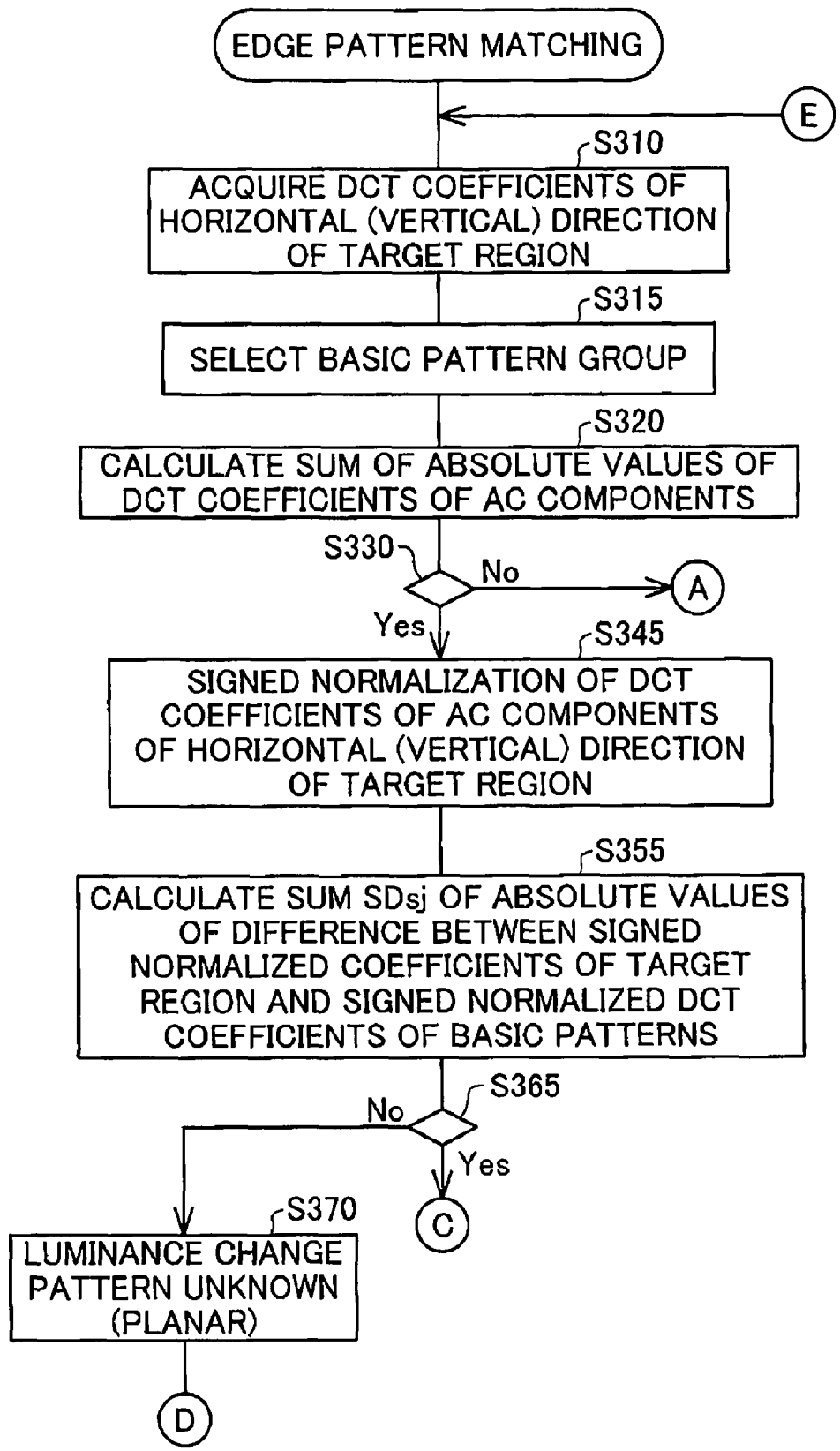
FIG. 15 is a flowchart showing the specifics of the edge pattern matching process in Embodiment 2.
Figures 16, 17:
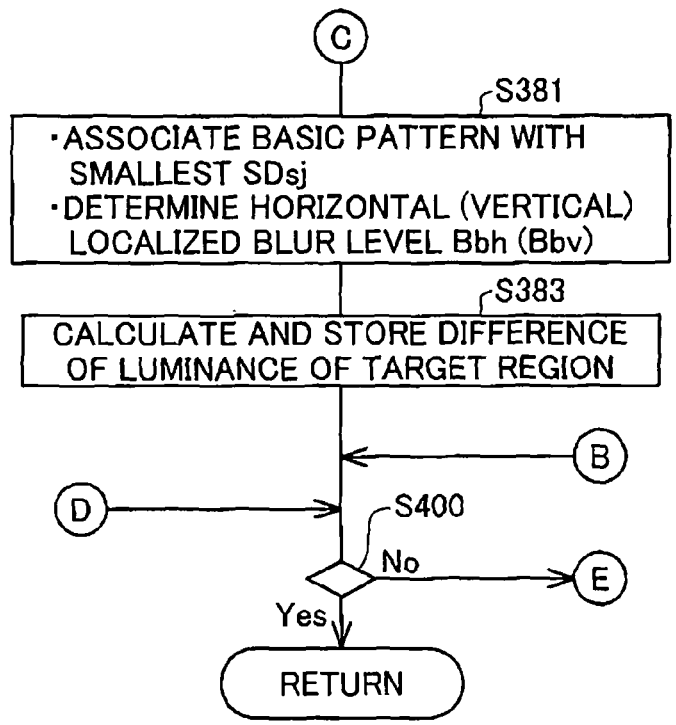
FIG. 16 is a flowchart showing the specifics of the edge pattern matching process in Embodiment 2.
FIG. 17 is a chart showing the method of selecting the basic pattern group in Step S315.

FIGS. 15 and 16 are flowcharts showing the specifics of the edge pattern matching process in Embodiment 2. In FIGS. 15 and 16, steps that carry processes identical to those of FIG. 5 of Embodiment 1 have been assigned identical symbols. In some instances, steps that carry out processes identical to those of FIG. 5 of Embodiment 1 will be omitted from the illustration and description for the simplicity.

In Step S310 of FIG. 15, the eight DCT coefficients F00-F07 of the horizontal direction of a given target region are acquired. The process of Step S310 is the same as in Embodiment 1.

In Step S315, on the basis of the DCT coefficients F01, F02, which have the first- and second-lowest frequency among the eight acquired DCT coefficients F00-F07, one basic pattern group is selected from the basic pattern groups PGa-PGd.

As noted previously, the direction of the pattern of luminance change can be identified based on the DCT coefficients F01, F02 (see FIG. 8). Thus, in Step S315, the basic pattern group is selected according to the direction of the pattern of luminance change, on the basis of the DCT coefficients F01, F02. The process of Step S315 is accomplished by a group selecting module as a function module of the CPU. The group selecting module is contained in the basic pattern selecting module 120 (see FIG. 1) as a function module of the CPU.

FIG. 17 is a chart showing the method of selecting the basic pattern group in Step S315. The notation method of the two columns at left in FIG. 17 is the same as the notation method of the two columns at right in FIG. 8. In Step S315, a basic pattern group is selected as shown in FIG. 17, depending on the sign of the DCT coefficient F01, and on whether the DCT coefficients F01, F02 have the same sign.

For example, where as shown in the uppermost row of FIG. 17, the sign of the DCT coefficient F01 of the target region is positive, and the sign of the DCT coefficient F02 is the same as the sign of the DCT coefficient F01 (i.e. positive), the pattern of luminance change will be considered to approximate a shape of luminance change decreasing towards the right in some pixel positions at the left, with luminance being constant at pixel positions to the right side of the pixel position (see FIG. 8). Therefore, the basic pattern group PGa containing basic patterns that have luminance change decreasing towards the right in pixel positions on the left and constant luminance in pixel positions to the right, will be selected (see FIG. 11).

By carrying out the process of Step S315, pattern matching can be carried out with a basic pattern group of luminance change patterns of similar tendencies, selected in advance. That is, the number of basic patterns for carrying out pattern matching can be limited in advance. The processing overhead of the process is therefore lower in comparison to a mode involving performing comparisons of the coefficients of the basic patterns Pja-Pjd of all of the basic pattern groups PGa-PGd.

In Step S320 of FIG. 15, the sum Sfh of the absolute values of the DCT coefficients F01-F07 of the AC components of the target region is calculated. The processes of Step S320 and the following Step S330 of Embodiment 2 are the same as in Embodiment 1.

In Step S345, signed normalized coefficients Fs01-Fs07 are calculated on the basis of the DCT coefficients F01-F07 of the AC components of the horizontal direction of the target region, in accordance with Eq. (8) below. Eq. (8) is an equation for calculating the signed normalized coefficients Fs01-Fs07 corresponding to the respective DCT coefficients F01-F07, on the basis of the DCT coefficients F01-F07, in such a way that the sum of their absolute values is 1. i is an integer from 1 to 7.

$$FsOi = \frac{FOi}{\sum_{k=1}^{7} |FOk|} \quad (i = 1 \sim 7) \tag{8}$$

In Step S355 of FIG. 15, SDsj is calculated in accordance with Eq. (9) below. Specifically, difference between the signed normalized coefficients Fs0$i$ (i=1-7) of the target region and the normalized DCT coefficients Cfsjxi (x is a, b, c, or d) of the luminance change basic patterns Pjx (j is 01-07, 11-15, 21-23, 31; x is a, b, c, or d) of the basic pattern group (PGx, where x is a, b, c, or d) selected in Step S315 is calculated. Then, the sum SDsj of the absolute values of the difference is calculated (j is 01-07, 11-15, 21-23, 31).

$$SDsj = \sum_{i=1}^{7} |FsOi - Cfsjxi| \tag{9}$$

x is a, b, c, or d.

j can assume the values 01-07, 11-15, 21-23, 31.

In Step S365, it is decided whether there exists any basic pattern for which SDsj is smaller than a prescribed threshold value Thsd.

In the event that there exists no basic pattern for which SDsj is smaller than a prescribed threshold value Thsd, the process advances to Step S370 (see FIG. 5). Specifically, the basic pattern associated with the target region will be designated as "unknown," and the pattern of luminance change of the target region will be designated as "planar." The process of Step S370 is the same as in Embodiment 1. Subsequently, the process advances to Step S400 of FIG. 16.

On the other hand, if a basic pattern Pj for which SDsj is smaller than a prescribed threshold value Thsd exists, in Step S381 of FIG. 16, the pattern with the smallest SDsj will be associated with the target region. Also, the blur width Bw of the associated basic pattern (see FIGS. 11 to 14) will be designated as the horizontal localized blur level Bbh of the target region. The process of Step S381 is identical to the process of Step S380 of FIG. 5, except that the decision is made on the basis of SDsj (see Eq. (9)) instead of SDj (see Eq. (4)).

In the process of Embodiment 1, pattern matching is carried out using the absolute values of the DCT coefficients F0$i$ (i=1-7) of the AC components of a target region (see Eq. (3)). Thus, there is a possibility that in actual practice the same given basic pattern will become associated with several different patterns of luminance change. For example, according to Eq. (3), Fr02 assumes the same value regardless of whether F02 is positive or negative. Thus, there exists a possibility that a pattern of luminance change in which F01, F02, and F03 are all positive will by treated as being identical with a pattern of luminance change in which F01 and F03 are positive, and F02 is negative.

In Embodiment 2, four basic pattern groups with different patterns of luminance change are prepared (see FIGS. 11 to 14), and a basic pattern group targeted for pattern matching is selected on the basis of the pattern of luminance change of the target region (see Step S315 of FIG. 15). Then, signed normalization which does not omit +/− sign information is carried out (see Eq. (8)), and pattern matching is then carried out on the basis of the signed normalized coefficients Fs0$i$ (i=1-7) (see Step S345 of FIG. 15 to Step S381 of FIG. 16). Thus, the likelihood of the same given basic pattern becoming associated with different patterns of luminance change in actual practice can be reduced.

In Step S383 of FIG. 16, an evaluation value Ld which corresponds to the difference between the maximum value and minimum value of luminance of the target region is calculated, and held in the main memory 150. The evaluation value Ld is derived with Eq. (10) below. The evaluation value Ld is an approximate value of the difference between the maximum value and minimum value of luminance of a target region.

$$Ld = \{Sfh/(\sqrt{2})Smat\} \times UL \quad (10)$$

Smat is the sum of the absolute values of the AC components of the basic pattern Pjx (x is a, b, c, or d) associated in Step S381. As mentioned previously, the sums Sja, Sjb, Sjc, Sjd of the absolute values of the AC components of the basic patterns Pja, Pjb, Pjc, Pjd are stored in advance in the ROM 160. UL is the difference between maximum luminance and minimum luminance of the basic patterns Pja, Pjb, Pjc, Pjd (see FIGS. 11 to 14).

The shape of the pattern of luminance change of a target region is a shape similar to the basic pattern Pjx associated with it in Step S381. The pattern of luminance change of a target region can be thought of as approximating the luminance change derived by increasing, by a constant multiple for luminance, the basic pattern Pjx associated in Step S381. Thus, the approximate value Ld of the difference between the maximum value and minimum value of luminance of a target region can be derived by multiplying the luminance differential UL of the basic pattern Pjx, by the value obtained by division of the "sum Sfh of the absolute values of the DCT coefficients F01-F07 of the AC components of the target region" by the "value of the $2\sqrt{2}$ multiple of the sum Smat of the absolute values of the one-dimensional DCT coefficients Cfjxi (i=1-7) of the AC components of the basic pattern Pjx associated in Step S381." Hereinafter, the evaluation value Ld will sometimes be denoted as "luminance differential Ld."

The DCT coefficients of image data in JPEG format are DCT coefficients derived through two-dimensional DCT (see FIG. 4). In contrast to this, the coefficients Cfjxi (j is 01-07, 11-15, 21-23, 31; x is a, b, c, or d; i is 1-7) of the basic patterns Pja are DCT coefficients derived through one-dimensional DCT of the luminance change pattern. Consequently, the approximate luminance differential Ld cannot be derived by means of dividing "the sum Sfh of the absolute values of the DCT coefficients F01-F07" by "the sum Smat of the absolute values of the one-dimensional DCT coefficients Cfjxi (i=1-7) of the AC components of the basic patterns Pjx."

The computational equation (11) used when deriving two-dimensional DCT coefficients Fuv (u=0-7, v=0-7) on the basis of luminance L(m, n) (m=0-7, n=0-7) of each pixel of a target region is as follows.

$$Fuv = \frac{1}{4} C(u)C(v) \sum_{m=0}^{7} \sum_{n=0}^{7} L(m,n) \cos\left\{\frac{(2m+1)u\pi}{16}\right\} \cos\left\{\frac{(2n+1)v\pi}{16}\right\} \quad (11)$$

$$u = 0 \sim 7$$
$$v = 0 \sim 7$$

$$C(u) = \begin{cases} \frac{1}{\sqrt{2}} & u = 0 \\ 1 & u \neq 0 \end{cases}$$

$$C(v) = \begin{cases} \frac{1}{\sqrt{2}} & v = 0 \\ 1 & v \neq 0 \end{cases}$$

Here, when calculating the values of F01-F07, i.e. where u=0, Eq. (11) is as follows. aL(n) represents average luminance in the vertical (column) direction of the (n+1)th column in an 8 row×8 column target region.

$$F0v = \frac{1}{4} \frac{1}{\sqrt{2}} C(v) \sum_{n=0}^{7} \left[\cos\left\{\frac{(2n+1)v\pi}{16}\right\} \sum_{m=0}^{7} L(m,n)\right] \quad (12)$$

$$= \sqrt{2} \, C(v) \sum_{n=0}^{7} \left[\left\{\frac{1}{8}\sum_{m=0}^{7} L(m,n)\right\} \cos\left\{\frac{(2n+1)v\pi}{16}\right\}\right]$$

$$= \sqrt{2} \, C(v) \sum_{n=0}^{7} \left[aL(n)\cos\left\{\frac{(2n+1)v\pi}{16}\right\}\right]$$

$$v = 0 \sim 7$$

$$C(v) = \begin{cases} \frac{1}{\sqrt{2}} & v = 0 \\ 1 & v \neq 0 \end{cases}$$

$$aL(n) = \frac{1}{8} \sum_{m=0}^{7} L(m,n)$$

On the other hand, the computational equation (13) used when deriving the one-dimensional DCT coefficients Cfjxi on the basis of luminance Ljxi (i=1-7; x is a, b, c, or d; j can assume the values 01-07, 11-15, 21-23, 31) is as follows.

$$Cfjxi = \frac{1}{2} C(i) \sum_{k=0}^{7} \left[\{Ljxk\}\cos\left\{\frac{2(k+1)i\pi}{16}\right\}\right] \quad (13)$$

$$i = 0 \sim 7$$

x is a, b, c, or d.
j can assume the values 01-07, 11-15, 21-23, 31.

$$C(i) = \begin{cases} \frac{1}{\sqrt{2}} & i = 0 \\ 1 & i \neq 0 \end{cases}$$

As will be apparent from a comparison of Eq. (12) with Eq. (13), F0v derived from Eq. (12) is equivalent to the $2\sqrt{2}$ multiple of the coefficient value derived by performing one-dimensional DCT on average luminance aL(n) in the column direction.

Therefore, the approximate value Ld of the difference between maximum luminance and minimum luminance of a target region can be derived by multiplying the luminance differential UL of the basic pattern Pjx, by the value obtained by dividing the "sum Sfh of the absolute values of the DCT coefficients F01-F07" by the "value of the $2\sqrt{2}$ multiple of the sum Smat of the absolute values of the one-dimensional DCT coefficients Cfjxi (i=1-7) of the AC components of the basic pattern Pjx." The relationship of the two-dimensional DCT coefficients and the one-dimensional DCT coefficients described above holds true for the two-dimensional DCT coefficients Fuv for which u=1=7 and v=0 as well.

Once the luminance differential Ld of the target region has been derived in this manner in Step S383, the process of Step S400 is subsequently performed, without performing the process of Step S390 (see FIG. 5). The process in Step S400 is the same as in Embodiment 1.

In Embodiment 2, the information regarding "direction of the pattern of luminance change of the target region" obtained in Step S390 in Embodiment 1 is obtained in Step S315 (FIG. 15). In Embodiment 2, in the event that a process is carried out using this information regarding "direction of the pattern of luminance change of the target region," the process will be carried out based on the information obtained and saved in Step S315.

Figure 18:
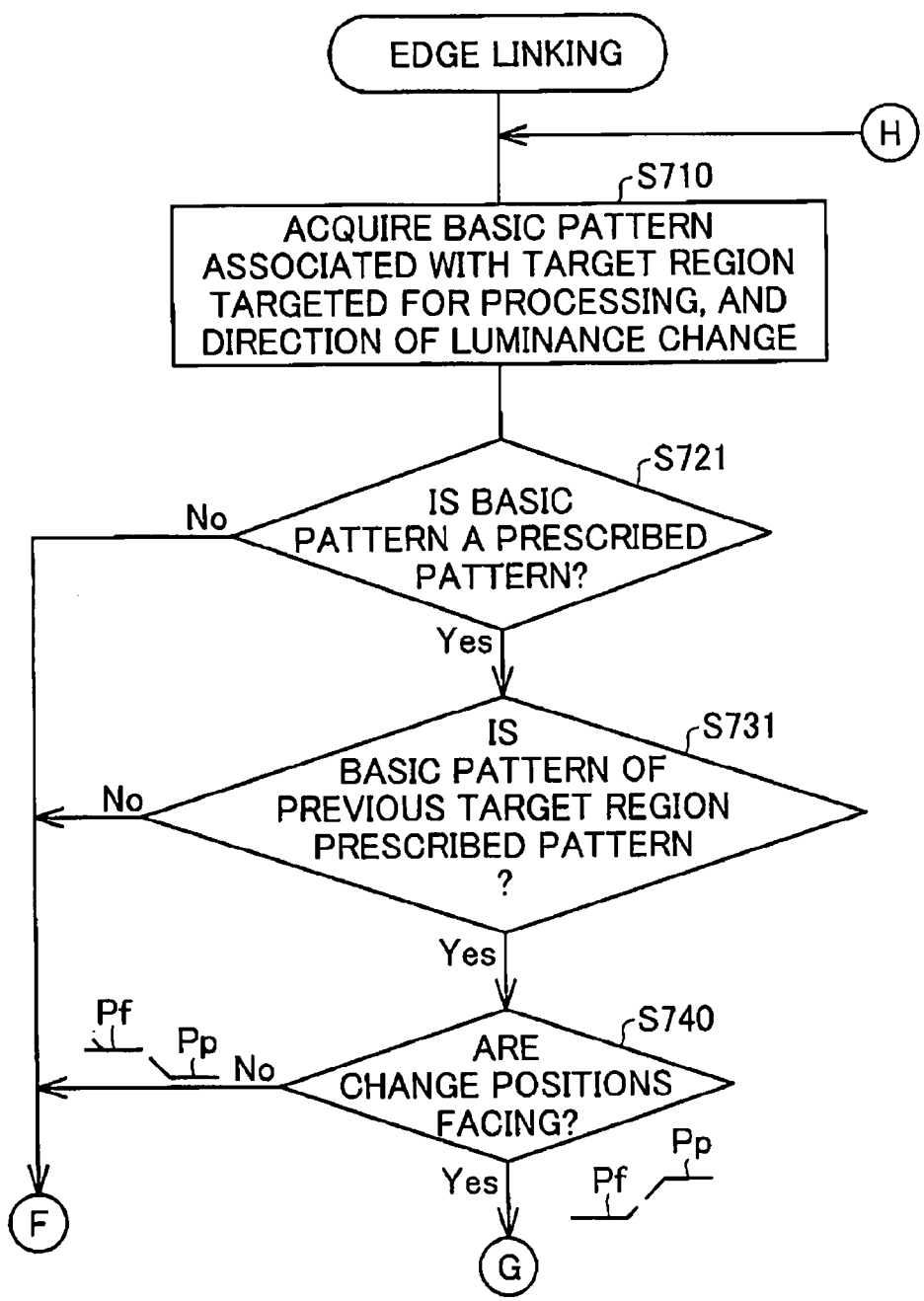
FIG. 18 is a flowchart showing the specifics of the edge linking process in Embodiment 2.
Figure 19:
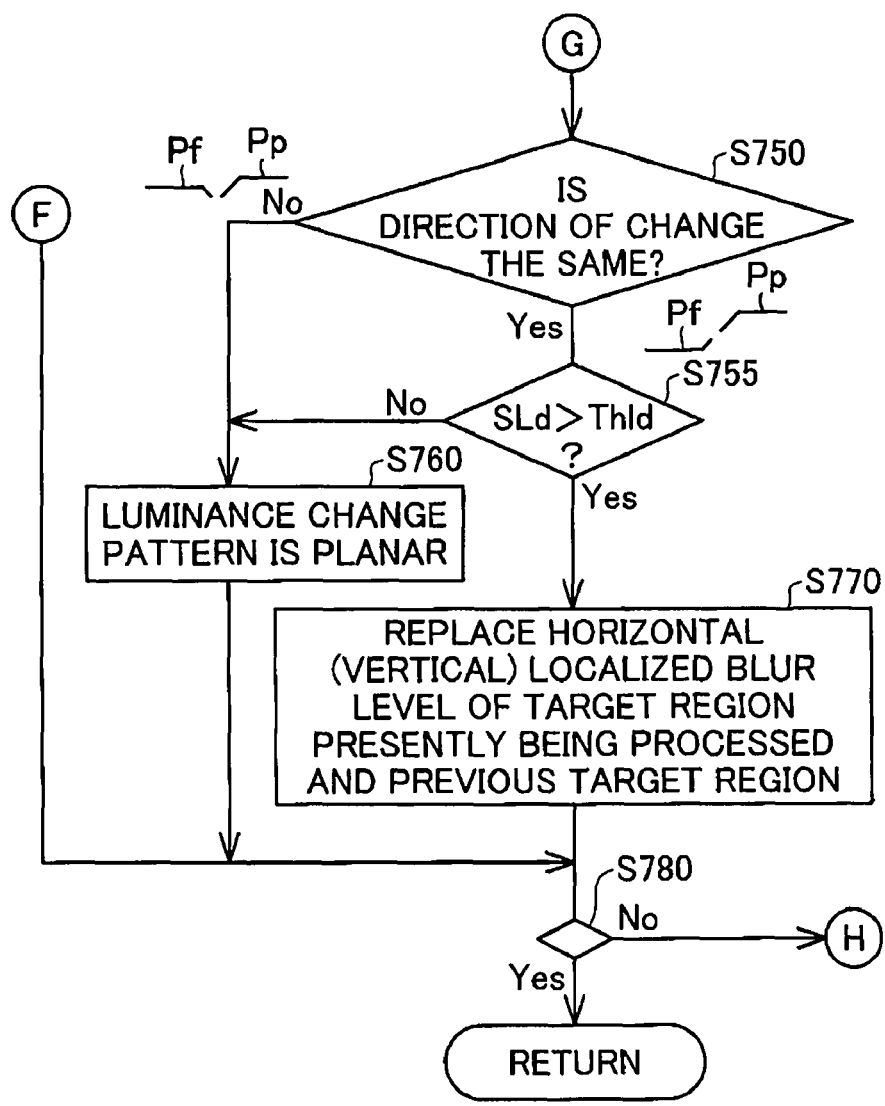
FIG. 19 is a flowchart showing the specifics of the edge linking process in Embodiment 2.

FIGS. 18 and 19 are flowcharts showing the specifics of the edge linking process in Embodiment 2. In the flowcharts of FIGS. 18 and 19, the basic patterns examined in Step S721, which corresponds to Step S720 in Embodiment 1, and in Step S731, which corresponds to Step S730 in Embodiment 1, are respectively different from corresponding one. Also, the flowcharts of FIGS. 18 and 19 have a decision and branching process in Step S755. In other respects the flowcharts of FIGS. 18 and 19 are the same as the flowchart of FIG. 10 of Embodiment 1. For Embodiment 2 as well, the edge linking process will be described taking the example of the horizontal direction. The process would be the same where the edge linking process is carried out for the vertical direction.

Step S721 of FIG. 18 is a process that corresponds to Step S720 of FIG. 10. In Step S721, it is decided whether the basic pattern associated with a target region is a pattern corresponding to any of the basic patterns P01-P07 or P11-P15 in Embodiment 1, from among the basic pattern groups PGa-PGd. More specifically, it is decided whether the basic pattern associated with the target region is P01a-P07a or P11a-P15a, P01b-P07b or P11b-P15b, P01c-P07c or P11c-P15c, or P01d-P07d or P11d-P15d. In the event that the basic pattern associated with the target region is any of these patterns, the process advances to Step S731. If not, the process advances to Step S780.

Step S731 of FIG. 18 is a process that corresponds to Step S730 of FIG. 10. In Step S731, it is examined whether the basic pattern associated with the target region Atf processed just before is a pattern corresponding to any of the basic patterns P01-P07 in Embodiment 1, from among the basic pattern groups PGa-PGd. More specifically, it is decided whether the basic pattern associated with the target region is P01a-P07a, P01b-P07b, P01c-P07c, or P01d-P07d. In the event that the basic pattern associated with the target region Atf processed just before is any of these patterns, the process advances to Step S740. If not, the process advances to Step S780. The process will advance to Step S780 even in the event that the target region presently being processed is a target region situated at the beginning of a row (left edge of the image).

Step S740 of FIG. 18 and Step S750 of FIG. 19 are the same as in Embodiment 1 (see FIG. 10) and will not be discussed here.

In Step S755, by way of a cumulative luminance differential SLd of the target region Atp, there is calculated the sum of the luminance differential Ld of the target region Atp (see Step S383 of FIG. 16) and the cumulative luminance differential SLdf of the target region Atf processed just before. The cumulative luminance differential SLd of a target region Atp is the sum value of the luminance differential Ld for a plurality of target regions that are present in succession in the horizontal direction, and for which any two mutually adjacent target regions meet the conditions of Step S721-S750.

Then, in Step S755 it is decided whether the cumulative luminance differential SLd is greater than a prescribed threshold value Thld. In the event that the cumulative luminance differential SLd is greater than the prescribed threshold value Thld, the process advances to Step S770. The process will advance from Step S755 to Step S770 even in the event that the target region presently being processed is a target region at the beginning of a line (left edge). The process beginning at Step S770 is the same as in Embodiment 1 (see FIG. 10).

On the other hand, if the cumulative luminance differential SLd is equal to or less than the prescribed threshold value Thld, the process advances to Step S760. In Step S760, the pattern of luminance change of the target region is replaced with "planar." That is, the target region is designated to be a "planar region." The horizontal localized blur level Bbh of the target region is then cleared (see Step S380 of FIG. 16). The cumulative luminance differential SLd of the target region is cleared as well. The subsequent process is the same as in Embodiment 1 (see FIG. 5). Where the cumulative luminance differential SLd is equal to or less than the prescribed threshold value Thld, this means that the luminance differential at the linked edges (boundary of mutually different color regions) does not exceed a certain level.

By carrying out the above process in Embodiment 2, a target region having a luminance differential that does not exceed a certain level for the horizontal direction can be classified as a planar region. As a result, it is possible to reduce the likelihood that an area having moderate change in color or brightness in an image, but that is not a boundary between regions of different color (i.e. a contour) will be treated as a contour and will be taken into consideration in the determination as to focus (see the process of Steps S60-S80 of FIG. 3). As a result, accuracy of determination as to focus can be improved.

In the present embodiment, the luminance differential Ld of a target region is calculated on the basis of the DCT coefficients F01-F07 of the AC components of the target region, and the AC components of the basic pattern associated with the target region (see Step S383). For this reason, the processing load is lower in comparison to a mode involving performing inverse DCT (Inverse Discrete Cosine Transform) on the basis of the DCT coefficients F00-F07 of the target region, calculating the luminance of each pixel, and then calculating the luminance differential. As a result, processing can be carried out in a shorter time.

The specifics of the edge pattern matching process have been described above taking the example of the horizontal direction. However, processing can be carried out in similar fashion for the vertical direction as well.

C. Modified Embodiments

The present invention is not limited to the embodiments set forth hereinabove, and may be reduced to practice in various ways without departing from the spirit thereof, for example through modified embodiments such as the following.

C1. Modified Embodiment 1

In the preceding embodiments, the edge pattern matching process was carried out on the basis of the luminance pattern of the pixels. However, the edge pattern matching process could instead be carried out on the basis of some other tone value of the pixels. For example, the edge pattern matching process could be carried out on the basis of tone values representing intensity of the red, green, or blue color components in an RGB color system, or intensity of Cr or Cb in a YCbCr color system. That is, the edge pattern matching process can be carried out on the basis of data that represents color, regardless of whether it is chromatic color having saturation and hue, or achromatic color that can be represented by luminance (brightness) only.

C2. Modified Embodiment 2

When carrying out the edge pattern matching process, a process such as the following can be carried out. Specifically, all of the basic patterns P01-P31 are ranked. This ranking is, for example, a ranking assigned to the basic patterns in order from those most likely to be selected in Step S380 of FIG. 5, using a prescribed number of photographic images as samples. This ranking could be made with reference to scenes in the photographs, such as "portrait," "landscape," or "night landscape," for example.

Then, when performing the edge pattern matching process, the sum SDj of the absolute values of difference between the normalized DCT coefficients Cfnji of the basic pattern and the normalized coefficients of the target region Fr0i (i—1-7) is calculated sequentially, in accordance with this ranking (see Step S350 or FIG. 5 and Eq. (4)). The first basic pattern of which SDj is lower than a prescribed threshold value will be associated with the target region. SDj will not be calculated for basic patterns ranked lower than the associated basic pattern.

In this modified embodiment, processing load can be reduced while minimizing loss of accuracy in the edge pattern matching process. While the preceding description was based on Embodiment 1, a similar process could be executed by means of ranking the basic patterns in the basic pattern groups in Embodiment 2.

C3. Modified Embodiment 3

In Embodiment 1, the basic pattern with the smallest value of SDj, i.e. "the sum of the absolute values of difference between the normalized coefficients Fr0i (i=1-7) of the target region and the normalized DCT coefficients Cfnji of the basic pattern Pj of luminance change" is associated with the target region. However, the basic pattern could be selected by some other method instead.

For example, the basic pattern with the smallest value of "the average of the absolute values of difference between the normalized coefficients of the target region and the normalized DCT coefficients Cfnji of the basic pattern Pj" could be associated with the target region. Alternatively, the basic pattern with the smallest value of "the sum of squares of difference between the normalized coefficients of the target region and the normalized DCT coefficients Cfnji of the basic pattern Pj" could be associated with the target region. Or, the basic pattern with the smallest value of "the average of squares of difference between the normalized coefficients of the target region and the normalized DCT coefficients Cfnji of the basic pattern Pj" could be associated with the target region.

That is, on the basis of coefficients representing change of color of a target region and the basic coefficients of the basic patterns, a pattern that, among a number of prescribed basic patterns, has the smallest difference between the two, or a basic pattern for which difference between the two is less than a prescribed criterion, could be selected as the basic pattern for association with the target region. While the preceding description was based on Embodiment 1, basic patterns can be selected by various methods in a similar manner, in Embodiment 2 as well.

C4. Modified Embodiment 4

In Embodiment 1 discussed above, each basic pattern holds normalized DCT coefficients (see FIG. 6); the DCT coefficients of the image data, after normalization, are compared with the normalized DCT coefficients of the basic patterns (see Steps S340 and S350 of FIG. 5). However, the basic coefficients associated with the frequency components could instead be held without being normalized. An embodiment in which the DCT coefficients of the image data are compared with these basic coefficients without normalization would then be possible.

Similarly, for Embodiment 2 as well, the basic coefficients associated with the frequency components of the basic patterns could be held without signed normalization. An embodiment in which the DCT coefficients of the image data are compared with these basic coefficients without signed normalization would then be possible.

C5. Modified Embodiment 5

In Embodiment 1 discussed above, in the edge linking process, the basic pattern associated with the target region processed just before is examined to determine if it is a prescribed basic pattern P01-P07 (Step S730 of FIG. 10). However, an embodiment in which, in Step S730, the basic pattern associated with the target region processed just before is examined to determine if it is a prescribed basic pattern P01-P07 or P11-P15 would be possible as well.

In this modified embodiment, in instances where a region of constant luminance equivalent to one pixel is present at an edge of the target region processed just before, processing can nevertheless be carried out similarly to that in instances where luminance varies continuously at the boundary of a target region. In this modified embodiment, the blur width of an edge (contour) of a color region in an image can be determined correctly, even in instances where, due to image processing errors, a region of constant luminance equivalent to one pixel has been produced at the edge of the region in the target region processed just before.

C6. Modified Embodiment 6

In Embodiment 1 and Modified Embodiment 5 discussed above, horizontal (vertical) localized blur level is modified on the basis of the sum of localized blur levels of both target regions, not only in instances where luminance continues to increase or decrease at the boundary of the target regions, but also in instances where there is a region of constant luminance equivalent to one pixel at the edge of the target region (see Step S720 of FIG. 10). However, an embodiment in which horizontal (vertical) localized blur level is modified on the basis of the sum of localized blur levels of the target regions in instances where there is a region of constant luminance equivalent to two or more pixels at the edge of the target region as well would also be possible. The size of the "region of constant luminance" serving as the criterion at this time can be specified on the basis of the size of the basic pattern and the size (pixel density) when the image of the image data is printed.

C7. Modified Embodiment 7

In the preceding embodiments, the basic patterns represented change of luminance in intervals having width equivalent to 8 pixels (see FIGS. 6 and 7). However, basic patterns representing change of luminance for intervals of different width could be prepared for use in the edge pattern matching process. In this modified embodiment, after the edge pattern matching process, it would be acceptable to either perform or not perform the edge linking process.

C8. Modified Embodiment 8

The edge linking process can be carried out for two or more target regions. An embodiment such as that described below for example, is a possible alternative to the preceding embodiments. Specifically, first, a target region with which the basic pattern P07 (a pattern of luminance that varies throughout the entire interval) has been associated is selected, and then a process similar to that of FIG. 10 is repeated for the target regions neighboring this target region to either side, to implement the edge linking process for three or more target regions.

Moreover, when calculating the sum value SLd of the luminance differential Ld for a plurality of target regions, comparing SLd with the prescribed threshold value Thld, and making a decision based on the luminance differential (see Step S755 of FIG. 18), an embodiment such as the following is preferred. Specifically, when carrying out the process of Step S770 of FIG. 18, there is respectively saved information indicating the number of target regions whose summed luminance differential Ld is represented by the cumulative luminance differential SLd of each target region. Prior to initially carrying out Step S770, the number of target regions is set to 1. Subsequently, when carrying out the process of storage system 755 for a given target region, the threshold value Thld for comparison will preferably be selected with reference to the number of target regions that were considered during the determination of the cumulative luminance differential SLd of the target region.

A modified embodiment such as following is possible as well. In the process illustrated in FIGS. 18 and 19, in Step S755, the cumulative luminance differential SLd is calculated, and in this state the process advances to Step S770, without performing the decision process. The localized blur level of each target region is initially determined in this way. Next, for each localized blur level that was replaced in Step S770, after Step S780, it is decided whether the level is greater than a prescribed threshold value. In the event that a replaced localized blur level is smaller than the prescribed threshold value, that localized blur level is cleared. This is, the localized blur level is zeroed out. The process then terminates.

With this modified embodiment as well, it is possible to reduce the likelihood that an area which is not a boundary between regions of different colors will be treated as a contour and taken into consideration in the determination of focus.

C9. Modified Embodiment 9

In Embodiment 1 discussed previously, the horizontal (or vertical) localized blur level of the target region Atp presently being processed and the target region Atf processed just before are replaced with new values (see Step S770 of FIG. 10). However, target regions whose horizontal (or vertical) localized blur level is replaced with new values are not limited to these target regions. For example, in another possible embodiment, the horizontal (or vertical) localized blur level of either the target region Atp presently being processed or the target region Atf processed just before is replaced with a new value.

Moreover, where the edge linking process is carried out for three or more target regions, in another possible embodiment the horizontal (or vertical) localized blur level of only one of the three or more target regions that were subjected to the edge linking process (e.g. the initial target region or the final target region) is replaced with a new value. In an alternative embodiment, horizontal (or vertical) localized blur levels of some or all of the three or more target regions that were subjected to the edge linking process are replaced with new values.

C10. Modified Embodiment 10

In Embodiment 1 discussed previously, association of patterns with planar regions (FIG. 9) was performed. In the preceding embodiments, in the edge linking process, the luminance change pattern was replaced with "planar" in the event of increasing luminance (Step S760 of FIG. 10). However, embodiments in which one or both of these processes are not performed are possible as well. With such a modified embodiment, the processing load can be reduced.

C11. Modified Embodiment 11

In the preceding embodiments, the larger one of the horizontal localized blur level Bbh and the vertical localized blur level Bbv of a target region is designated as the localized blur level Bb of the target region (see Step S50 if FIG. 3). However, the localized blur level Bb of target regions could be determined by some other method.

For example, the smaller of the horizontal localized blur level Bbh and the vertical localized blur level Bbv of a target region could be designated as the localized blur level Bb of the target region. Alternatively, the arithmetic mean or geometric mean of the horizontal localized blur level Bbh and the vertical localized blur level Bbv of a target region could be designated as the localized blur level Bb of the target region. During this process, the horizontal localized blur level Bbh and the vertical localized blur level Bbv may be respectively weighted. That is, the localized blur level can be calculated using the horizontal localized blur level and the vertical localized blur level of the target region.

C12. Modified Embodiment 12

In the preceding embodiments, the threshold values (e.g. the threshold value Thbb of Step S60 or the threshold value Thrf of Step S80 in FIG. 3, the threshold value Thsf of Step S33 or the threshold value Thsd of Step S360 in FIG. 5, or the threshold value Thsda of Step S540 in FIG. 9) were fixed. However, these threshold values could instead be selected with reference to the characteristics of the image data.

For example, it would be preferable to select the threshold values used in each step, according to the brightness of the image of the image data. The reason is that, for a given luminance (color) differential, the extent to which it will be noticeable to the human eye will differ depending on the absolute magnitude of luminance. Similarly, for a given width of the boundary of change from one color to another, the extent to which it will be noticeable to the human eye will differ depending on luminance in the area where the boundary is present.

Also, it is preferable to set the threshold values according to each color component red, green, blue or Cr, Cb. The reason is that the extent to which a given tone differential or a given edge width will be noticeable to the human eye is different for different colors.

C13. Modified Embodiment 13

In the preceding embodiments, when the proportion Rf obtained by dividing the number Nf of focused regions in the image by the sum of the number Nf of focused regions and the number Nn of unfocused regions is equal to or greater than the prescribed threshold value Thrf, the image of the image file is determined to be a focused image (see Steps S70 and S80 of FIG. 3). A focused region is a region in which localized blur level Bb is less than the prescribed threshold value Thbb (see Step S60 of FIG. 3). However, the determination as to whether an image is focused could be made by some other method instead.

For example, it could be decided that a photographic image is a focused image in the event that a rectangular region of prescribed size, in which focused regions having localized blur level smaller than a first criterion value present in the rectangular region in a greater number than a second criterion value, is present in the photographic image. With this embodiment, it is possible to decide that an image in which an area of particular importance to the user (e.g. a facial region where a face appears) is in-focus is an image that is focused, even if other areas of the image are not in focus.

Where the image is to be printed out on L size (8.9 cm×12.7 cm) paper, the rectangular region can be one of dimensions H cm×W cm. Here, H and W are preferably 0.1-1.5 and 0.8-1.2 respectively. Typically in an L size photograph, the subject that the user intended to shoot will be approximately these dimensions or less.

The second criterion value will preferably be 75%, more preferably 80%. The first criterion value can be a pixel count such that the image has a dimension of T mm when printed in L size (8.9 cm×12.7 cm). T can be 0.3-0.7, preferably 0.4-0.6. These criterion values can be determined on the basis of the pixel count of the image data, and the dimensions of the image of the image data when printed out.

A photographic image can be determined to be focused image in the event that target regions of localized blur level less than the first criterion value are present in the photographic image. With this embodiment, in the event that the user has taken a picture focused on a subject that appears small within the image, it can nevertheless be determined that that photographic image is a focused image.

A photographic image can also be determined to be focused image in the event that, when a region of the photographic image is divided into a first region in proximity to the center and a second region in proximity to the periphery surrounding the first region, focused areas are present within the first region in a prescribed number or a prescribed proportion or more. With this modified embodiment, it is possible for an image with a person at the center, with the person in-focus and the background blurred, to be judged to be a focused image.

Specifically, the determination as to whether a photographic image is a focused image can be made by comparing a threshold value with the blur level of the photographic image data as a whole as determined by a statistical method, on the basis of localized blur level in specified regions in a photographic image.

Modified Embodiment 14

In the embodiments hereinabove, the image data is image data having frequency coefficients derived by means of discrete cosine transform (DCT). The basic patterns are saved in the ROM 160, also in the form of frequency coefficients derived by means of discrete cosine transform (DCT). However, a modified embodiment in which the image data contains frequency coefficients derived by some other orthogonal transform would be possible as well. In such a modified embodiment, the basic patterns will preferably be saved in the form of frequency coefficients derived by this same orthogonal transform. Examples of orthogonal transforms are discrete cosine transform, discrete Fourier transform, discrete sine transform, and other such normalized orthogonal transforms.

Modified Embodiment 15

In the embodiments hereinabove, the image data file read out in Step S10 of FIG. 3 is a JPEG image data file. However, a modified embodiment in which image data files of some other format, such as BMP image data files, are read out would be possible as well. In such a modified embodiment, the process starting from Step S20 will preferably be carried out after calculation in advance of coefficients of a plurality of frequency components representing a pattern of change along a prescribed direction of a target region which is part of an image.

Modified Embodiment 16

In the embodiments hereinabove, the printer 1 was furnished with a card slot 70 for reading data from an inserted memory card. However, the printer 1 could instead be furnished with other means besides a card slot 70, for receiving image data files. For example, the printer 1 could be provided with a communications portion able to receive image data files from the outside via a wired or wireless communications network.

Modified Embodiment 17

In the embodiments hereinabove, the example of an all-in-one printer 1 was described (see FIG. 1). However, the present invention can be implemented in processes of various kinds, involving focus determination for a plurality of image data files, and selection of candidate image data files as focused images. The present invention can also be implemented as a computer for carrying out a process of deciding whether images of image data are blurred. Information indicating whether an image having undergone this process is a blurred image could be generated by way of data and appended to the image data file.

The present invention can also be embodied, for example, as a computer system having a display portion such as a liquid crystal display or plasma display, an input portion such as a keyboard or mouse, a CPU, and main memory. In such an embodiment, the CPU of the computer system would perform functions similar to the CPU 100 of the preceding embodiments. An image of the selected image data file would be displayed on the display portion.

Yet another embodiment of the present invention is a system having a projector system which projects an image data file selected as a candidate, onto a flat surface or into space. That is, output of image data files is not limited to printout onto a printing medium, and can take various other forms such as display on a display device, projection to the outside by a projector portion, and so on.

In the systems described above, in yet another possible embodiment, after candidate image data files for output have been selected on the basis of blur level, a process to select a target for output from among the candidates may be carried out, and output such as printing or display performed thereafter. It would also be possible, for example, after selecting from among a number of image data files candidate image data files for output on the basis of blur level, and then displaying these images on the display 40, to then have the user select whether or not to print each image.

Modified Embodiment 18

In Embodiment 2 above, difference between the maximum value and minimum value of luminance was calculated on the basis of the DCT coefficients and the signed normalized coefficients of the basic patterns (see Eq. (10), Eq. (7)). However, difference between the maximum value and minimum value of color density or luminance could be calculated instead by calculating color density and luminance of each pixel position from the DCT coefficients.

Modified Embodiment 19

In the preceding embodiments, the plurality of coefficients derived by normalization or signed normalization were coefficients with absolute values whose sum is 1. However, normalization and signed normalization are not limited thereto, and other embodiments are possible as well. That is, normalization and signed normalization can be carried out in such a way that the sum of the absolute values of the plurality of coefficients derived thereby is a constant value for each basic pattern and luminance change pattern of a target region.

Modified Embodiment 20

In Embodiment 2 above, the sums Sja, Sjb, Sjc, Sjd of the absolute values of the AC components of the basic patterns Pja, Pjb, Pjc, Pjd have been stored in advance in the ROM 160. However, the values stored in the ROM 160 could be other values relating to the sums Sja, Sjb, Sjc, Sjd of the absolute values of the AC components of the basic patterns Pja, Pjb, Pjc, Pjd.

For example, the values stored in the ROM 160 could be values Snja, Snjb, Snjc, Snjd derived by taking the $\sqrt{2}$ multiple of the sums Sja, Sjb, Sjc, Sjd of the absolute values of the AC components of the basic patterns Pja, Pjb, Pjc, Pjd, and dividing them by the UL. In this case, luminance differential Ld can be calculated with the following equation, using the Snjx (x is a, b, c, or d) values stored in the ROM 160.

$$Ld = Sfh/Snjx \quad (14)$$

In an embodiment such as Embodiment 1, in which magnitude of the luminance differential of basic patterns differs by individual basic pattern (see FIG. 7), there may be saved in the ROM 160 values derived by dividing the $\sqrt{2}$ multiple of the sum of the absolute values of the AC components of each basic pattern, by the luminance differential of the basic pattern (the difference between the maximum value and minimum value of luminance). Using these values, luminance differential Ld can be calculated on the basis of the sum of the absolute values of the DCT coefficients of the AC components of the horizontal direction of the target region.

In any of these embodiments, the luminance differential Ld, which is equivalent to the difference between the maximum value and minimum value of luminance, is a value derived by multiplying a prescribed constant, by a value derived by dividing "the sum Sfh (or Sfv) of the absolute values of the DCT coefficients of the AC components of the horizontal direction (or vertical direction) of the target region" by the "sum of the absolute values of the AC components of the basic pattern."

C21. Modified Example 21

In the embodiments hereinabove, some of the elements realized through hardware could instead be replaced by software, and conversely some of the elements realized through software could instead be replaced by hardware. For example, some of the functions of the CPU 100 of the printer 1 could be executed by a computer connected to the printer.

A computer program for implementing such functions could be provided in a form recorded onto a floppy disk, CD-ROM, or other such computer-readable recording medium. The host computer would read the computer program from the recording medium, and transfer it to an internal storage device or external storage device. Alternatively, the computer program could be provided to the host computer from a program supply device via a communication pathway. When implementing the functions of the computer program, the computer program stored in the internal storage device will be executed by the microprocessor of the host computer. The computer program recorded onto the recording medium can also be executed directly by the host computer.

The term computer herein a concept that includes both hardware devices and the operating system, and refers to hardware devices operating under control by the operating system. In such a host computer, the computer program implements the functions of the parts discussed above. Some of the functions could be implemented by the operating system, rather than by application programs.

In the present invention, the "computer-readable recording medium" is not limited to portable recording media such as a floppy disk or CD-ROM, and is understood to include as well internal memory devices inside the computer, such as various types of RAM and ROM, as well as fixed external memory devices of the computer, such as a hard disk.

The Program product may be realized as many aspects. For example:

(i) Computer readable medium, for example the flexible disks, the optical disk, or the semiconductor memories;

(ii) Data signals, which comprise a computer program and are embodied inside a carrier wave;

(iii) Computer including the computer readable medium, for example the magnetic disks or the semiconductor memories; and (iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and

What is claimed is:

1. A printing device that selects and prints candidate image data from among multiple sets of image data, comprising:
   a data acquiring unit that acquires one set of image data from among multiple sets of image data, the image data including a plurality of coefficients representing a pattern of change of color of an image along a prescribed direction, the plurality of coefficients corresponding respectively to different frequency component;
   a basic pattern memory that stores a multiple sets of basic pattern data that respectively include a plurality of basic coefficients representing a pattern of change of color, the plurality of basic coefficients corresponding respectively to different frequency components, each of the multiple sets of basic pattern data including data representing a basic blur level that represents blur level in color boundary areas;
   a basic pattern selecting unit that selects one set of selected basic pattern data from among the multiple sets of basic pattern data, on the basis of comparison of the plurality of coefficients included in the acquired image data, with the plurality of basic coefficients respectively included in the multiple sets of basic pattern data stored in the basic pattern memory;
   a candidate determining unit that calculates blur level of the image data on the basis of the basic blur level associated with the selected basic pattern data, and determining on the basis of the blur level whether to designate the acquired image data as a candidate; and
   a printing unit that prints image data selected as the candidate.

2. The printing device according to claim 1 wherein
   the basic pattern selecting unit, in the event that a prescribed first condition is met, selects the selected basic pattern data on the basis of comparison of the plurality of coefficients representing the pattern of change of color of the image along the prescribed direction within a target region which is part of the image of the image data, with the plurality of basic coefficients respectively contained in the multiple sets of basic pattern data stored in the basic pattern memory, and
   the candidate determining unit
      on the basis of the basic blur level of the selected basic pattern data, determines a localized blur level of the target region, and
      on the basis of the localized blur levels of a plurality of the target regions included in the image of the acquired image data, determines whether to designate the acquired image data as the candidate.

3. The printing device according to claim 2 wherein
   the basic coefficients are coefficients corresponding to AC components among the frequency components, and
   the basic pattern selecting unit selects the selected basic pattern data, on the basis of comparison of the coefficients corresponding to AC components among the plurality of coefficients of the target region, and the plurality of basic coefficients respectively included in the multiple sets of basic pattern data.

4. The printing device according to claim 3 wherein
   the plurality of basic coefficients are positive numbers and sum of the plurality of basic coefficients in one set of the basic pattern data is a certain value, and
   the basic pattern selecting unit further calculates, for the target region, the coefficients corresponding to the frequency components on the basis of proportions of the magnitudes of the absolute values of the frequency components, in a manner such that the sum will equal the certain value.

5. The printing device according to claim 4 wherein
   the multiple sets of basic pattern data have data of prescribed ranking, and
   the basic pattern selecting unit, when selecting the selected basic pattern data,
      compares the plurality of basic coefficients of the multiple sets of basic pattern data, in order in accordance with the prescribed ranking, to the plurality of coefficients of the target region; and
      selects as the selected basic pattern data the initial pattern for which difference between the plurality of basic coefficients and the plurality of coefficients is less than a prescribed criterion.

6. The printing device according to claim 4 wherein
   the plurality of basic coefficients represent, as the basic pattern of change of color, a pattern of change of luminance changing from a first value to a second value within a prescribed interval,
   the basic blur level is a value corresponding to a width of an interval of change from the first value to the second value, within the prescribed interval, and
   in the event that an interval of change in luminance in first selected basic pattern data selected on the basis of a first target region, and an interval of change in luminance in second selected basic pattern data selected on the basis of a second target region neighboring the first target region in the prescribed direction, are respectively situated at an edge to a side of the other target region within the prescribed interval, and directions of change in luminance is same, the candidate determining unit calculates the localized blur level of at least one of the first and second selected basic pattern data, on the basis of the sum of the basic blur level of the first and second selected basic pattern data.

7. The printing device according to claim 6 wherein
   in the event that, in the first and second selected basic pattern data, the interval of change of luminance is present up to a location inward by no more than a prescribed value from the edge of the respective other target region in the prescribed interval, and the direction of change in luminance is the same, the basic pattern selecting unit calculates the localized blur level of at least one of the first and second selected basic pattern data, on the basis of the sum of the basic blur level of the first and second selected basic pattern data.

8. The printing device according to claim 2 wherein
   the first condition is that the sum of the absolute values of the plurality of coefficients of the target region is greater than a prescribed criterion value.

9. The printing device according to claim 8 wherein
   in the event that the first condition is not met, and a prescribed second condition is met, the basic pattern selecting unit selects the selected basic pattern data on the basis of the difference in luminance of the two mutually neighboring target regions.

10. The printing device according to claim 2 wherein
    the candidate determining unit, when determining the localized blur level,
    selects the selected basic pattern data based on the plurality of coefficients representing the pattern of change of color of the image in the target region along a horizontal direction of the image as one of the prescribed directions, and calculates horizontal blur level of the target region based on the basic blur level of the selected basic pattern data;

selects the selected basic pattern data based on the plurality of coefficients representing the pattern of change of color of the image in the target region along a vertical direction of the image as one of the prescribed directions, and calculates vertical blur level of the target region based on the basic blur level of the selected basic pattern data; and determines the localized blur level of the target region on the basis of the horizontal blur level and the vertical blur level.

11. The printing device according to claim 2 wherein the candidate determining unit designates the acquired image data to be the candidate in the event that a region of prescribed size is contained in the image of the acquired image data, and the region contains target regions having localized blur level smaller than a first criterion value present in a greater number than a second criterion value.

12. The printing device according to claim 1 wherein the multiple sets of basic pattern data are classed into a plurality of basic pattern data groups respectively including one or more of sets of the basic pattern data, and the basic pattern selecting unit includes a group selecting unit for selecting one of the plurality of basic pattern data groups on the basis of some of the plurality of coefficients of the image data, during selection of the selected basic pattern data, and selects one set of selected basic pattern data from among the multiple sets of basic pattern data, on the basis of comparison of the plurality of coefficients contained in the image data, with the plurality of basic coefficients contained in the basic pattern data of the selected basic pattern data group.

13. The printing device according to claim 12 wherein in the event that a prescribed first condition is met, the basic pattern selecting unit selects the selected basic pattern data on the basis of a comparison of the plurality of coefficients representing the pattern of change of color of the image along the prescribed direction within a target region which is part of the image of the image data, with the plurality of basic coefficients respectively contained in the multiple sets of basic pattern data stored in the basic pattern memory, and the candidate determining unit on the basis of the basic blur level of the selected basic pattern data, determines a localized blur level of the target region; and on the basis of the localized blur levels of a plurality of the target regions included in the image of the acquired image data, determines whether to designate the acquired image data as the candidate, the basic coefficients are coefficients corresponding to AC components among the frequency components, the basic pattern selecting unit selects the selected basic pattern data, on the basis of comparison of the coefficients corresponding to AC components among the plurality of coefficients of the target region, and the plurality of basic coefficients respectively included in the multiple sets of basic pattern data;

the plurality of basic coefficients are coefficients sum of whose absolute values is a certain value, and the basic pattern selecting unit further calculates, for the target region, the coefficients corresponding to the frequency components on the basis of the frequency components, in a manner such that the sum of absolute values will equal the certain value.

14. The printing device according to claim 12 wherein the group selecting unit selects one of the plurality of the plurality of basic pattern data groups, on the basis of the sign of coefficients that, among the plurality of coefficients, correspond to AC components of the first and second lowest frequency among the frequency components.

15. The printing device according to claim 1 wherein the basic pattern selecting unit, in the event that a prescribed first condition is met, selects the selected basic pattern data associated with a target region, on the basis of comparison of the plurality of coefficients representing the pattern of change of color of the image along the prescribed direction within the target region which is part of the image of the image data, with the plurality of basic coefficients respectively contained in the multiple sets of basic pattern data stored in the basic pattern memory; and the candidate determining unit on the basis of the basic blur level of the selected basic pattern data, determines a localized blur level of the target region included in the image of the acquired image data;

on the basis of the plurality of coefficients of the target region, determines a first evaluation value corresponding to a difference between a maximum value and a minimum value of color density in the target region;

on the basis of the first evaluation value of the target regions included in the plurality of target regions, determines a second evaluation value relating to the plurality of target regions included in the image of the acquired image data; and in the event that the second criterion value meets a prescribed second condition, determines whether the acquired image data is the candidate, based on the localized blur level of the target regions included in the plurality of target regions.

16. The printing device according to claim 15 wherein the plurality of target regions are a plurality of target regions present in succession in the prescribed direction, and which meet a prescribed condition relating to the selected basic pattern data.

17. The printing device according to claim 16 wherein the prescribed condition relating to the selected basic pattern data includes, as at least a part of the prescribed condition, a condition that the basic pattern represented by the selected basic pattern data include an area of luminance change at last one edge of the basic pattern.

18. The printing device according to claim 15 wherein the candidate determining unit derives the first evaluation value, based on the ratio of the sum of absolute values of coefficients that are the coefficients of the target region and that correspond to AC components among the frequency components, to the sum of absolute values of coefficients that are the basic coefficients of the selected basic pattern data and that correspond to AC components among the frequency components.

19. A method that calculates blur level of an image of image data, comprising:

acquiring image data that includes a plurality of coefficients representing a pattern of change of color of an image along a prescribed direction, the plurality of coefficients corresponding respectively to different frequency components;

preparing multiple sets of basic pattern data that respectively include a plurality of basic coefficients representing a pattern of change of color, the plurality of basic coefficients corresponding respectively to different frequency components, each of the multiple sets of the basic pattern data including data representing a basic blur level that represents blur level in color boundary areas;

on the basis of comparison of the plurality of coefficients included in the acquired image data with the plurality of basic coefficients respectively included in the multiple sets of basic pattern data, selecting one set of selected basic pattern data from among the multiple sets of basic pattern data; and calculating blur level of the image of the image data, based on the basic blur level associated with the selected basic pattern data.

20. A computer program stored on a non-transitory computer readable medium, the computer program, when executed, causing a computer to calculate blur level of an image of image data, the computer program comprising:

a portion that acquires image data that includes a plurality of coefficients representing a pattern of change of color of an image along a prescribed direction, the plurality of coefficients corresponding respectively to different frequency components;

a portion that prepares multiple sets of basic pattern data that respectively include a plurality of basic coefficients representing a pattern of change of color, the plurality of basic coefficients corresponding respectively to different frequency components, each of the multiple sets of the basic pattern data including data representing a basic blur level that represents blur level in color boundary areas;

a portion that, on the basis of comparison of the plurality of coefficients included in the acquired image data with the plurality of basic coefficients respectively included in the multiple sets of basic pattern data, selects one set of selected basic pattern data from among the multiple sets of basic pattern data; and a portion that calculates blur level of the image of the image data, based on the basic blur level associated with the selected basic pattern data.

* * * * *